(12) United States Patent  
Oshima

(10) Patent No.: US 8,980,150 B2
(45) Date of Patent: Mar. 17, 2015

(54) THREE-DIMENSIONAL SHAPING METHOD AND SHAPED OBJECT COMPLEX AS WELL AS THREE-DIMENSIONAL SHAPING APPARATUS

(71) Applicant: Casio Computer Co., Ltd., Shibuya-ku, Tokyo (JP)

(72) Inventor: Kouji Oshima, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/787,793

(22) Filed: Mar. 6, 2013

(65) Prior Publication Data

US 2013/0244040 A1    Sep. 19, 2013

(30) Foreign Application Priority Data

Mar. 8, 2012    (JP) .................................. 2012-052141

(51) Int. Cl.
*B29C 67/00* (2006.01)
*B32B 5/16* (2006.01)

(52) U.S. Cl.
CPC ............... *B29C 67/0074* (2013.01); *B32B 5/16* (2013.01); *B29C 67/0081* (2013.01)
USPC .......................................... 264/113; 264/308

(58) Field of Classification Search
None
See application file for complete search history.

(56) References Cited

U.S. PATENT DOCUMENTS

| 5,897,825 | A | 4/1999 | Fruth et al. |
| 6,989,115 | B2 | 1/2006 | Russell et al. |
| 7,435,072 | B2 | 10/2008 | Collins et al. |
| 2009/0261067 | A1* | 10/2009 | Dietrich ......................... 216/83 |
| 2012/0018926 | A1* | 1/2012 | Mannella et al. ............. 264/500 |
| 2012/0113439 | A1* | 5/2012 | Ederer .......................... 358/1.9 |

FOREIGN PATENT DOCUMENTS

| JP | 9-511705 A | 11/1997 |
| JP | 2004-358968 A | 12/2004 |
| JP | 2008-302701 A | 12/2008 |
| WO | WO 2009/010034 | * 1/2009 |

OTHER PUBLICATIONS

Japanese Office Action dated Jan. 17, 2014 (and English translation thereof) in counterpart Japanese Application No. 2012-052141.

* cited by examiner

*Primary Examiner* — Mary F Theisen
(74) *Attorney, Agent, or Firm* — Holtz, Holtz, Goodman & Chick PC

(57) ABSTRACT

A three-dimensional shaping method includes forming a combination to be each level of a three-dimensional shaped object and also forming a combination to be each level of a shaped object support member in each of a plurality of powder material layers having an uncured powder material in accordance with hierarchical shape data corresponding to each of the powder material layers.

7 Claims, 20 Drawing Sheets

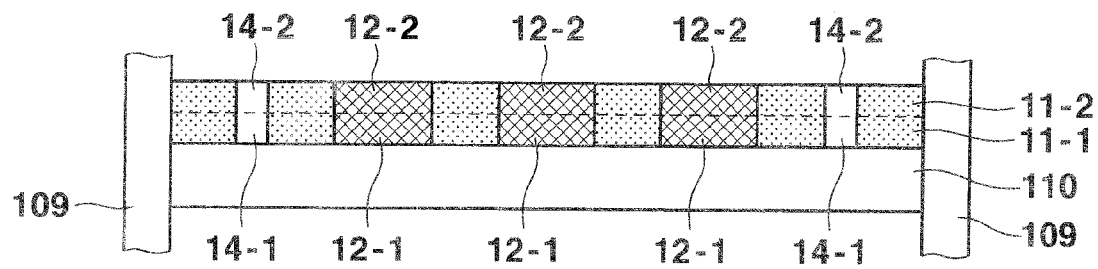
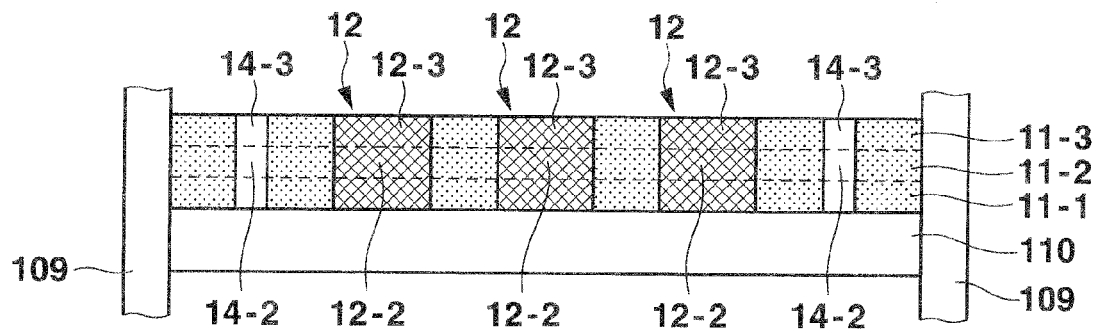
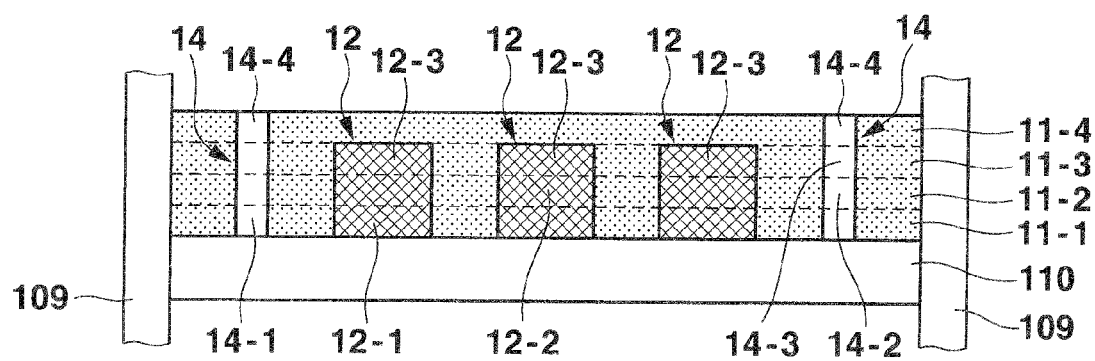
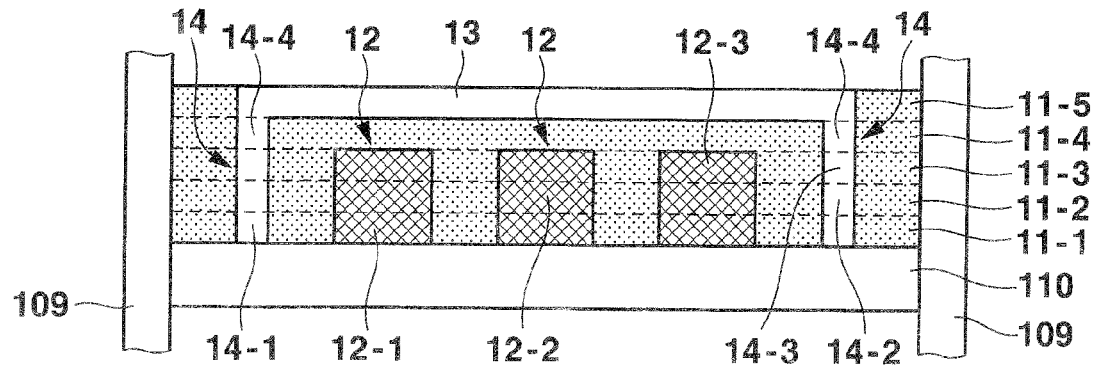

THREE-DIMENSIONAL SHAPING METHOD AND SHAPED OBJECT COMPLEX AS WELL AS THREE-DIMENSIONAL SHAPING APPARATUS

CROSS-REFERENCE TO RELATED APPLICATIONS

This application is based upon and claims the benefit of priority from prior Japanese Patent Application No. 2012-052141, filed Mar. 8, 2012, the entire contents of which are incorporated herein by reference.

BACKGROUND OF THE INVENTION

1. Field of the Invention

The present invention relates to a three-dimensional shaping method and a shaped, object complex as well as a three-dimensional shaping apparatus. More particularly, it relates to a three-dimensional shaping method to a form a three-dimensional shaped object (three-dimensional object) by using a powder stacking method, and a shaped object complex for use in the three-dimensional shaping method, as well as a three-dimensional shaping apparatus to conduct the three-dimensional shaping method.

2. Description of the Related Art

A three-dimensional stack shaping method is known as a method of forming (shaping) a three-dimensional shaped object. The three-dimensional stack shaping method is roughly as follows: In accordance with three-dimensional data regarding a target shaped object, hierarchical data indicating hierarchical shapes of the shaped object that is sliced into layers in a particular direction, and material layers patterned into shapes corresponding to the hierarchical data are sequentially stacked to form a shaped object. Here, for example, a powder stacking method that uses powder is known as the three-dimensional stack shaping method. This stack shaping method is capable of directly manufacturing a three-dimensional shaped object from three-dimensional computer aided design (CAD) data, and is therefore a technique that has rapidly spread along with the spread and utilization of the three-dimensional CAD in designing and manufacturing sites.

The above-mentioned powder stacking method forms a three-dimensional shaped object by stacking layers upward while repeating the process of thinly spreading a powder material on the upper surface of a stage and using, for example, a binder, heat, or a photo-curing substance to cure (bind) the powder material in a region corresponding to the above-mentioned hierarchical data and form a combination of one material layer. Here, in this powder stacking method, shaped objects are stacked and formed in the stacked powder material. The feature of this method is that a three-dimensional shaped object can be easily and satisfactorily formed by the removal of the uncured powder material after the formation of the shaped object. In particular, layers of combinations are formed, and an inkjet method used in inkjet printers to discharge the above-mentioned binder from a printer head is applied as a means of joining (firmly bonding) the layers of the combinations, so that the already established Inkjet printer technique can be used to easily and satisfactorily form a three-dimensional shaped object. A three-dimensional shaping technique that uses the above-mentioned powder stacking method is described in detail in, for example, Jpn. Pat. Appln. KOKAI Publication No. 2008-302701.

However, as the shaped object is buried into the stacked powder material and thus manufactured, the visibility of the completed shaped object buried in the powder material is low. Particularly, if a plurality of shaped objects are simultaneously manufactured, the shaped objects tend to bump into each other when taken out from the powder material in which the shaped objects are buried. The three-dimensional shaped object formed by the three-dimensional shaping method that uses the above-mentioned powder stacking method is generally lower in flexibility than shaped objects formed by shaping methods or forming method that use other materials. Therefore, this three-dimensional shaped object is unfortunately easy to break, for example, when being formed or taken out. Disadvantageously, this three-dimensional shaped object is thus unsuited for mass production.

BRIEF SUMMARY OF THE INVENTION

The present invention has been made in consideration of the above prior art, and has as its object to provide a three-dimensional shaping method, a shaped object complex, and a three-dimensional shaping apparatus, in which damage to the shaped objects can be inhibited, respectively.

A three-dimensional shaping method according to the present invention comprises:

forming a combination to be each level of a three-dimensional shaped object and also forming a combination to be each level of a shaped object support member in each of a plurality of powder material layers having an uncured powder material in accordance with hierarchical shape data corresponding to each of the powder material layers.

A shaped object complex according to the present invention comprises:

a three-dimensional shaped object of one stage including a combination of a plurality of levels;

a three-dimensional shaped object of another stage including a combination of different levels of the three-dimensional shaped object; and a shaped object support member which includes a combination of the same level as the three-dimensional shaped object of the one stage and which supports the three-dimensional shaped object of the other stage.

A three-dimensional shaping apparatus according to the present invention comprises:

a binder discharging unit which drops a binder in each of a plurality of powder material layers having an uncured powder material in accordance with hierarchical shape data corresponding to each of the powder material layers and which forms a combination to be each level of a three-dimensional shaped object and also forms a combination to be each level of a shaped object support member in the powder material layers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 4A, 4B, 4C, and 4D are schematic process views (No. 2) showing how the shaped objects and the tray are formed in the shaped object/support member stack shaping process according to the first embodiment;

DETAILED DESCRIPTION OF THE INVENTION

Hereinafter, embodiments of a three-dimensional shaping method and a shaped object support member as well as a three-dimensional shaping apparatus according to the present invention will be shown and described in detail, (Three-Dimensional Shaping Method)

First, the three-dimensional shaping method and the shaped object support member according to the present invention are described.

First Embodiment

Figure 1:
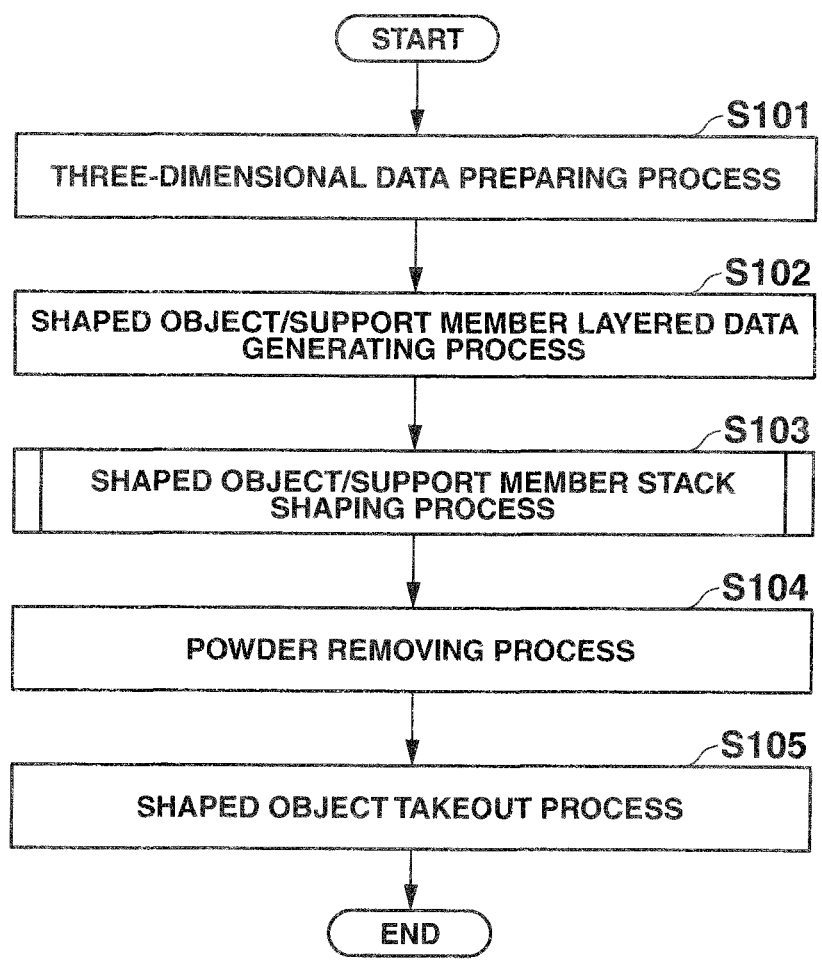
FIG. 1 is a flowchart showing a first embodiment of a three-dimensional shaping method according to the present invention.
Figure 2:
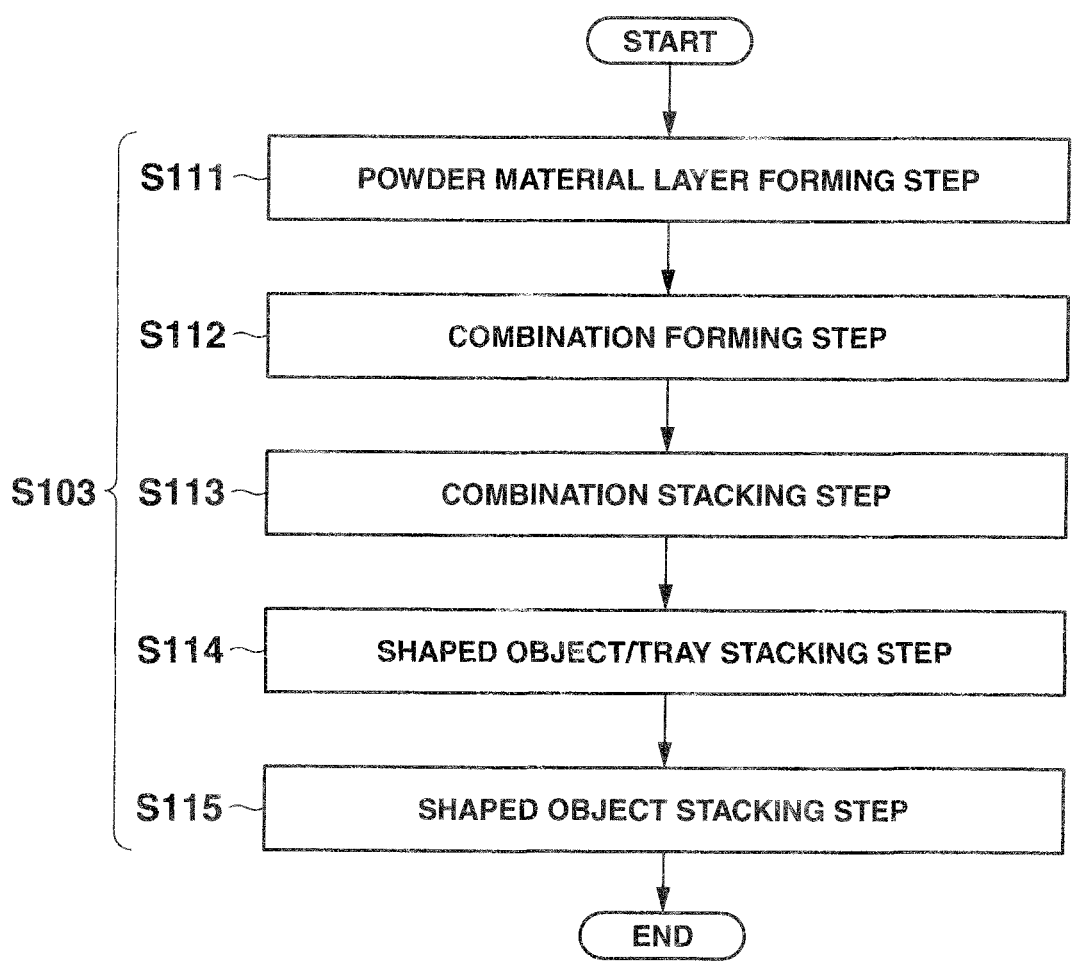
FIG. 2 is a flowchart showing an example of a shaped object/support member stack shaping process in the three-dimensional shaping method according to the first embodiment.
Figure 6A:
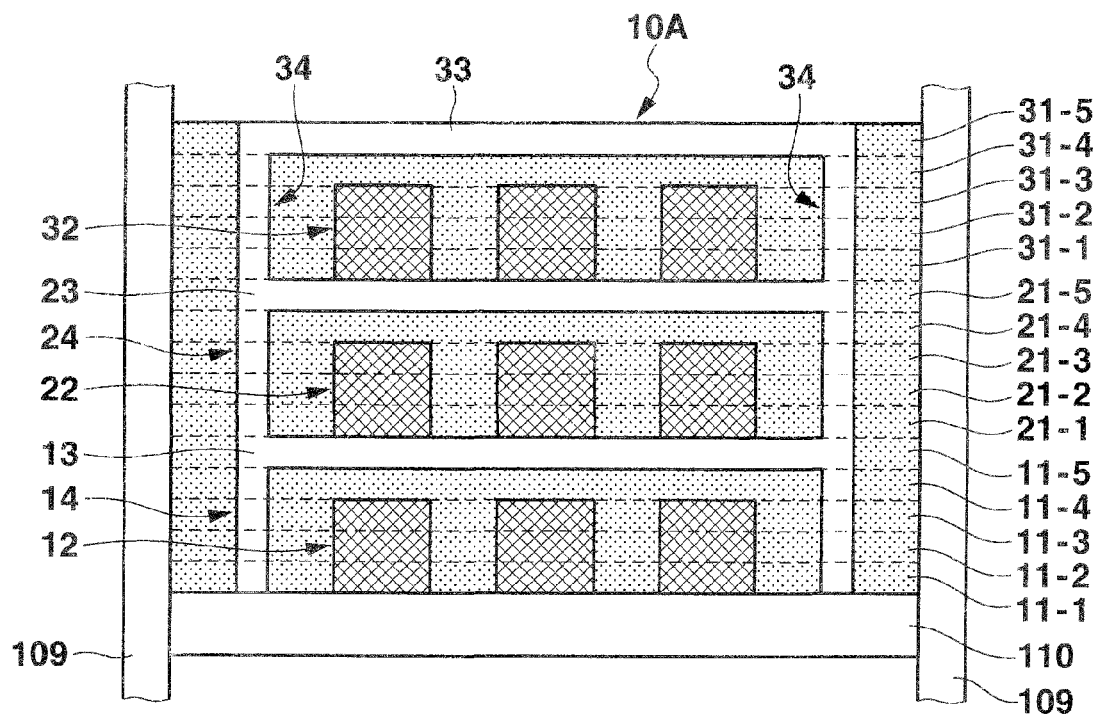
FIGS. 6A and 6B are schematic process views (No. 4) showing how the shaped objects and the tray are formed in the shaped object/support member stack shaping process according to the first embodiment.
Figure 6B:
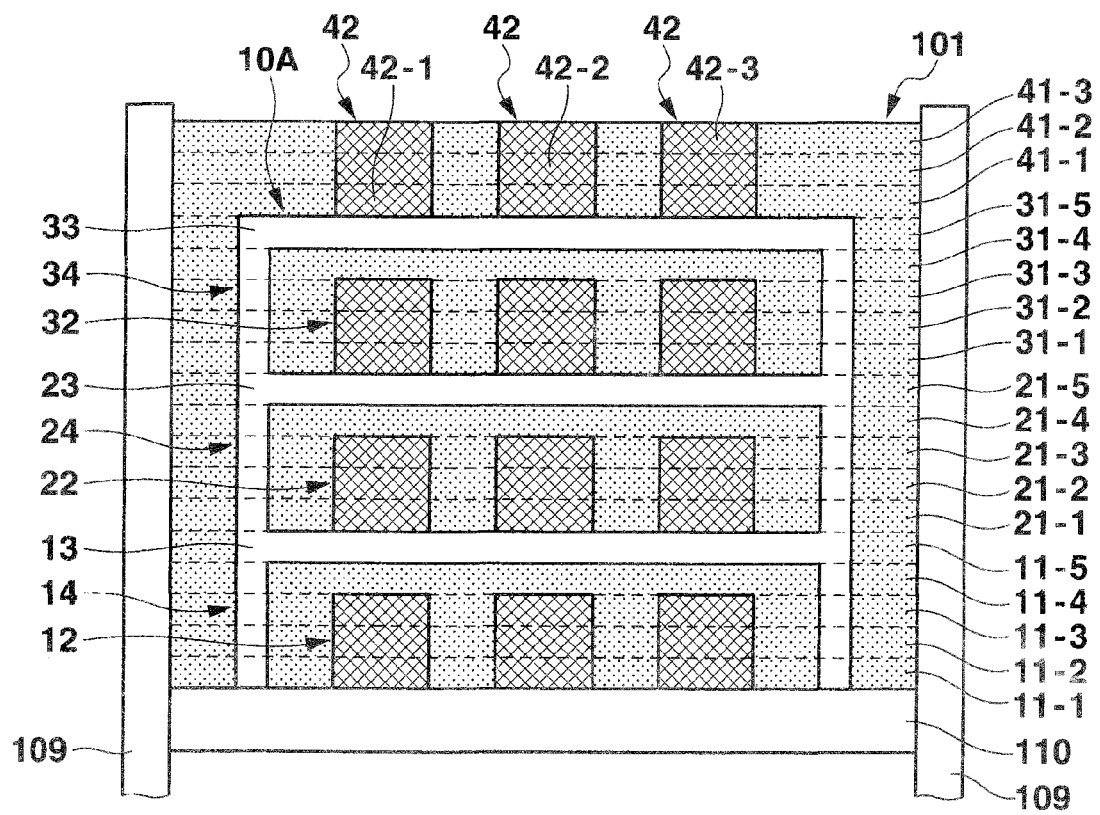
Figure 7:
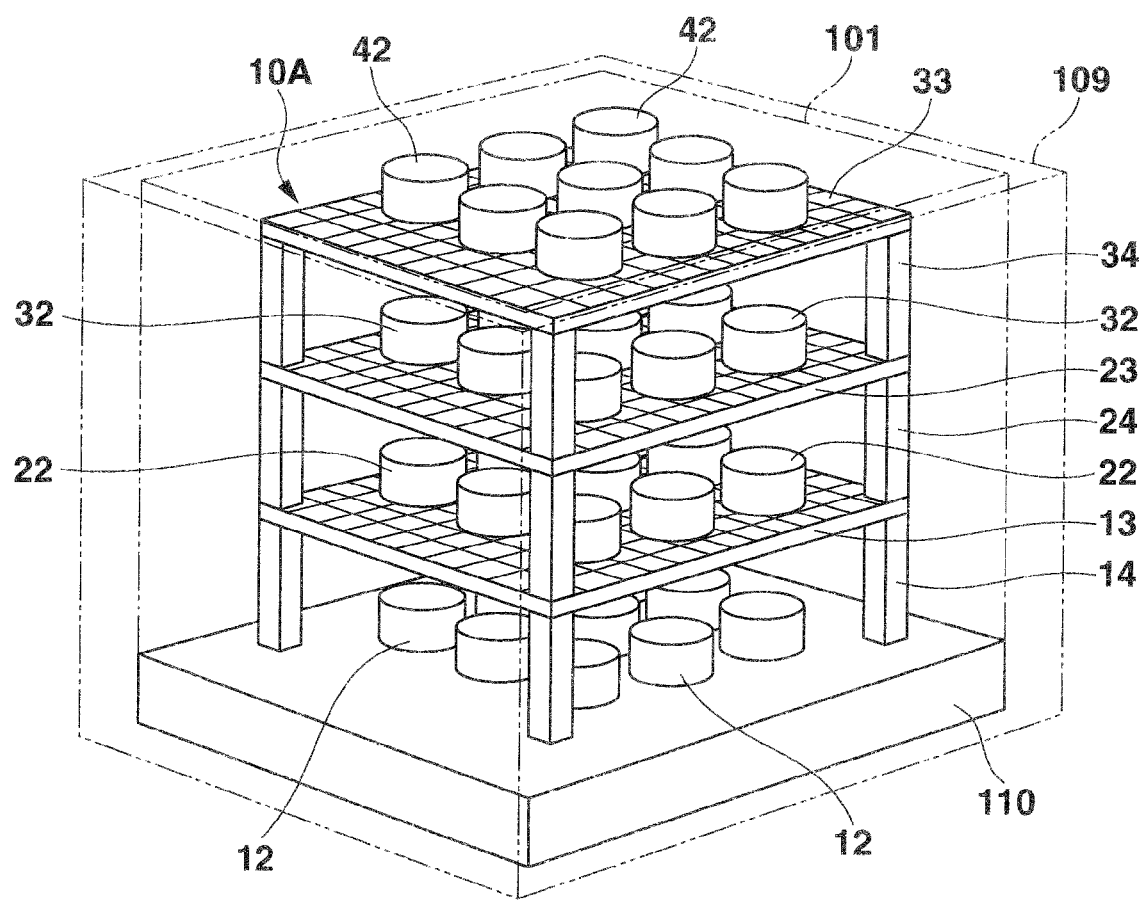
FIG. 7 is a schematic configuration diagram showing an example of the shaped objects and the tray that are formed by the shaped object/support member stack shaping process according to the first embodiment.
Figure 8A:
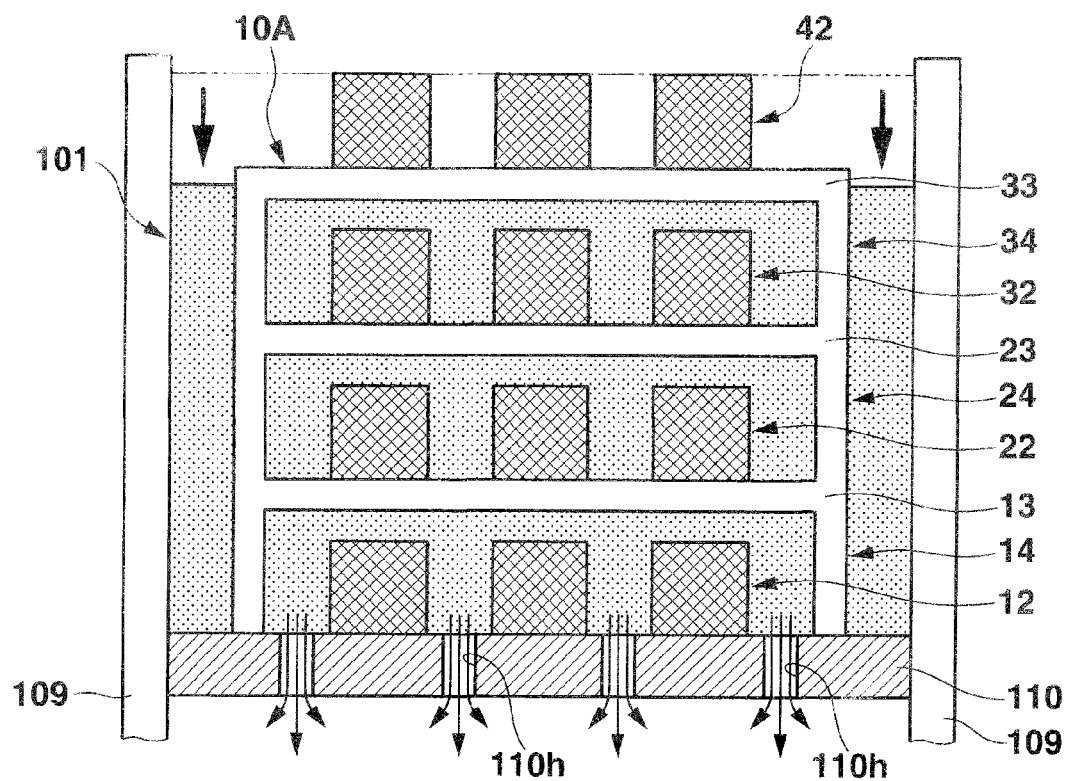
FIGS. 8A and 8B are schematic process views showing how the shaped objects are supported in a powder removing process and a shaped object takeout process according to the first embodiment.
Figure 8B:
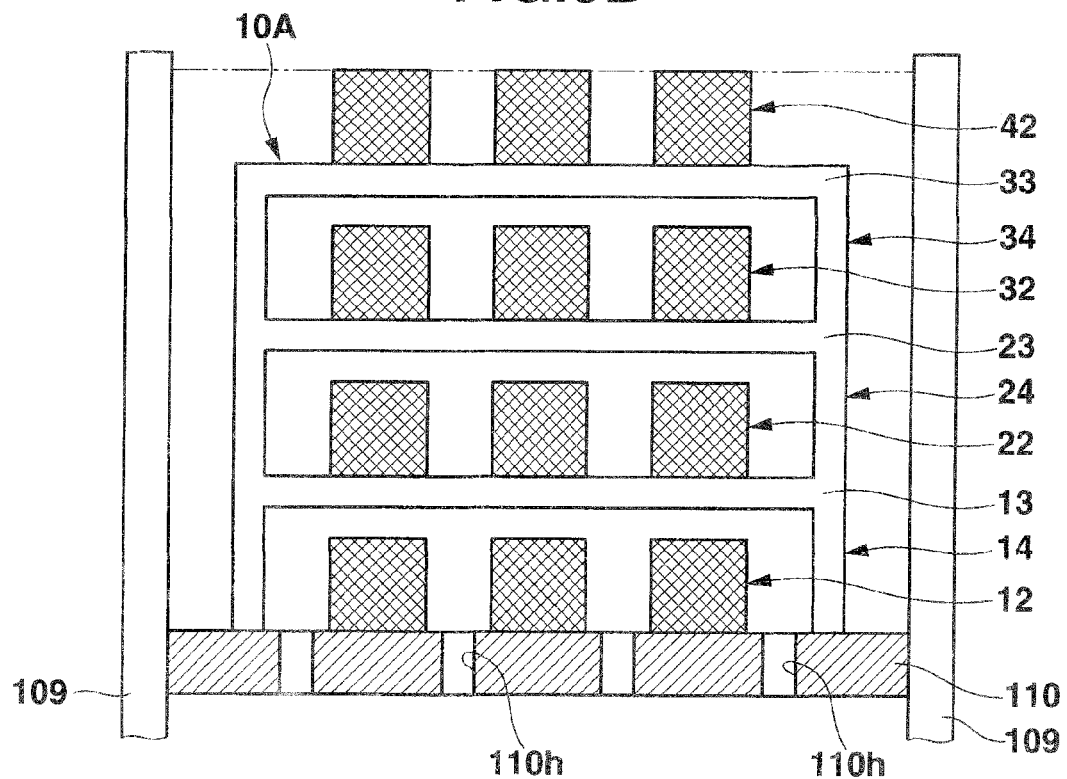

FIG. 1 is a flowchart showing the first embodiment of the three-dimensional shaping method according to the present invention. FIG. 2 is a flowchart showing an example of a shaped object/support member stack shaping process in the three-dimensional shaping method according to the present embodiment. FIG. 3A to FIG. 3E, FIG. 4A to FIG. 4D, FIG. 5A to FIG. 5C, and FIG. 6A and FIG. 6B are schematic process views showing how shaped objects and a tray (shaped object support member) are formed in the shaped object/support member stack shaping process according to the present embodiment. FIG. 7 is a schematic configuration diagram showing an example of the shaped objects and the tray that are formed by the shaped object/support member stack shaping process according to the present embodiment. Here, in FIG. 1, powder material layers are see-through, and the shaped objects and the tray are only shown for ease of explanation. FIGS. 8A and 8B are schematic process views showing how the shaped, objects are supported in a powder removing process and a shaped object takeout process according to the present embodiment.

As shown in FIG. 1, the first embodiment of the three-dimensional shaping method, according to the present invention generally comprises a three-dimensional data preparing process (S101), a shaped object/support member hierarchical, data generating process (S102), a shaped object/support member stack, shaping process (S103), a powder removing process (S104), and a shaped object takeout process (S105). In the present embodiment, a plurality of three-dimensional shaped objects (hereinafter simply abbreviated as "shaped objects") are mounted on a tray which is a shaped object support member, and stacked and formed in layers in the powder material layers stacked on a shaping stage, in the shaped object/support member stack shaping process (see FIG. 7).

First, in the three-dimensional data preparing process (S101), three-dimensional CAD data regarding the shaped objects to be shaped in the shaped object/support member stack shaping process (S103) is prepared. In the three-dimensional data preparing process (S101), a powder material to constitute the shaped objects, and a binder to bind and cure the powder material is also prepared. In the three-dimensional shaping method that uses a powder stacking method according to the present embodiment, powder of gypsum such as alpha-gypsum or powder of a resin such as starch, polypropylene, polycarbonate, polyethylene terephthalate, or nylon can be used as the powder material. The binder may contain a catalyst for the powder material to cure and react. In this case, sulfate is preferred if the powder material is gypsum. A resin bonding material may be used as the binder. The binding here includes at least one of chemical binding and physical bonding.

In the shaped object/support member hierarchical data generating process (S102), the upper surface of a shaping stage for forming shaped objects is then used as a reference plane to generate, on the basis of the prepared three-dimensional CAD data, hierarchical shape data (hereinafter referred to as "shaped object hierarchical data" for convenience) regarding layers of the shaped object that is sliced (divided) in a plane parallel to the reference plane.

Moreover, in the shaped object/support member hierarchical data generating process (S102), for a plurality of shaped objects stacked and formed in layers above the shaping stage, hierarchical shape data (hereinafter referred to as "tray hierarchical data" for convenience) is generated regarding layers of the tray for mounting and supporting the shaped objects of the respective stages when the tray is sliced (divided) into layers in the plane parallel to the reference plane as in the case with the above-mentioned shaped objects. The shape of the tray will be described in detail later. In the present embodiment, for example, as shown in FIG. 7, the tray comprises tray bodies 13, 23, and 33 respectively disposed on the lower sides of the shaped objects 22, 32, and 42 of the respective stages, and pillars 14, 24, and 34 which are provided on the lower sides of the tray bodies 13, 23, and 33 and which define the spaces between the tray bodies 13, 23, and 33. The tray has a configuration in which layers of the tray bodies and the pillars are formed into one. Here, as the shaped objects of the first stage are formed and arranged on the upper surface of the shaping stage, the upper side of these shaped objects is covered by the tray body 13 and pillars 14 of the first stage. Although the tray body is supported by the lower pillars, the tray body may be bound to the pillars, or may be only mounted on the pillars without being bound to the pillars so that the manufactured shaped objects can be easily taken out from, a tank.

As shown in FIG. 2, the shaped object/support member stack shaping process (S103) comprises a powder material layer forming step (S111), a combination forming step (S112), a combination stacking step (S113), a shaped object/tray stacking step (S114), and a shaped object stacking step (S115).

Figure 3A:
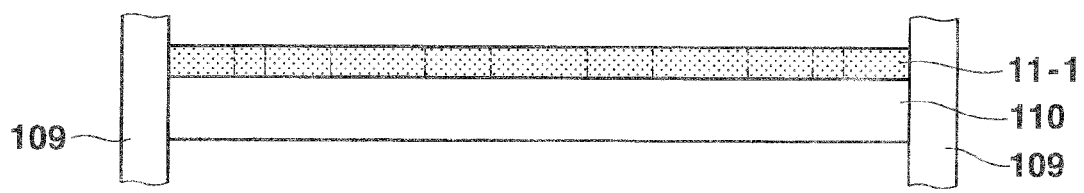
FIGS. 3A, 3B, 3C, 3D, and 3E are schematic process views (No. 1) showing how the shaped objects and a tray are formed in the shaped object/support member stack shaping process according to the first embodiment.

First, in the powder material layer forming step (S111), an uncured powder material is flatly deposited to a predetermined thickness on the upper surface of a shaping stage 110 surrounded by a tank 109 of a three-dimensional shaping apparatus, and one layer (i.e. first layer of the first stage) of a powder material layer 11-1 is thereby formed, as shown in FIG. 3A. The predetermined thickness of the powder material layer 11-1 is set to, for example, about 0.1 mm or more.

Figure 3B:
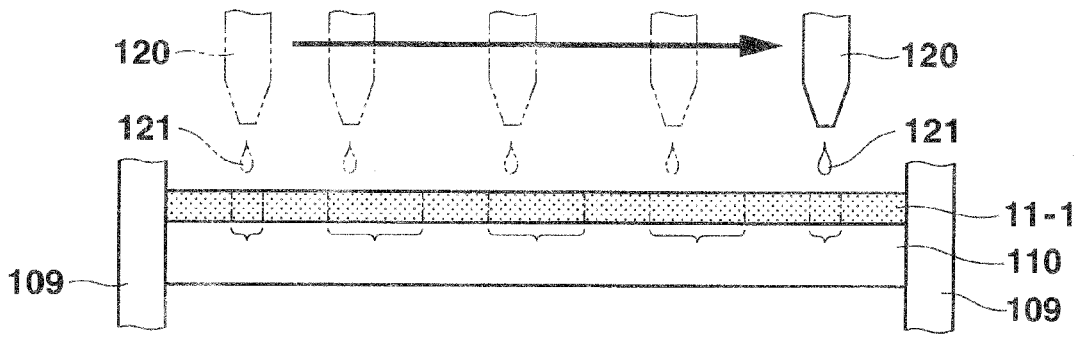
Figure 3C:
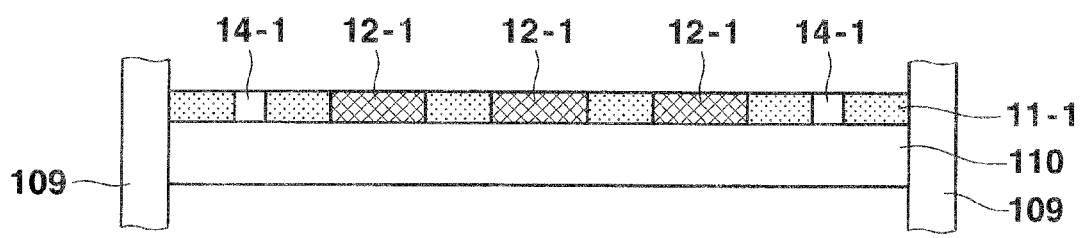

In the combination forming step (S112), the powder material layer 11-1 is selectively cured in accordance with the shaped object hierarchical data and the tray hierarchical data generated from the three-dimensional CAD data, and a combination corresponding to the hierarchical shape of the shaped objects and a combination corresponding to the hierarchical shape of the pillars of the tray are thereby simultaneously formed in the powder material layer 11-1. More specifically, as shown in FIG. 3B, a binder discharging unit 120 scans in accordance with the shaped object hierarchical data and the tray hierarchical data of the first layer from the reference plane among the shaped object hierarchical data and the tray hierarchical data when the upper surface of the shaping stage 110 is used as a reference plane. At the same time, a binder 121 is discharged from the binder discharging unit 120 to regions of the powder material layer 11-1 of the first layer corresponding to the hierarchical data. That is, the hierarchical shape of the first layer of the shaped objects and the tray is drawn in the powder material layer 11-1 by the dropped binder 121. This binder 121 is cured. Consequently, as shown in FIG. 3C, the powder material of the powder material layer 11-1 is bound and cured in the regions where the binder 121 has infiltrated, and a combination 12-1 corresponding to the hierarchical shape of the first layer of the shaped objects and a combination 14-1 corresponding to the hierarchical shape of the first layer of the pillars of the tray are formed. Here, the binder discharging unit 120 comprises a printer head used in an inkjet printer or a discharge mechanism equivalent to a printer head used in an inkjet printer, as will be described later.

Figure 3D:
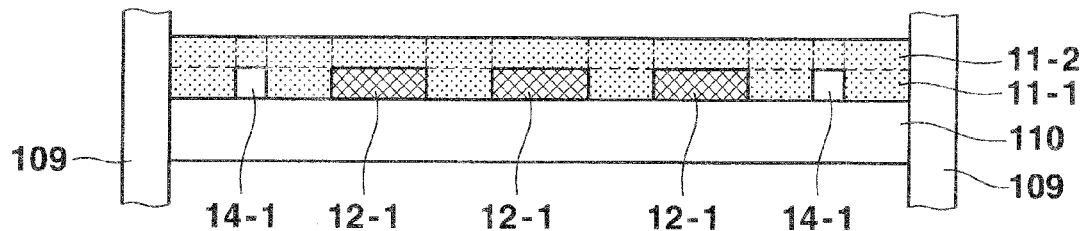

In the combination stacking step (S113), the powder material layer forming step (S111) and the combination forming step (S112) are then repeated to sequentially stack the combinations formed in the respective powder material layers and thus form the shaped objects and the tray for each layer. More specifically, as shown in FIG. 3D, the powder material is flatly deposited to a predetermined thickness on the upper surface of the powder material layer 11-1 of the first layer on the shaping stage 110 to form a powder material layer 11-2 of a second layer. Here, the shaping stage 110 descends by one thickness of the powder material layer 11-2 of the second layer in the tank 109 together with the powder material layer 11-1 of the first layer. The powder material layer 11-2 of the second layer is then deposited on the powder material layer 11-1 of the first layer.

Figure 3E:
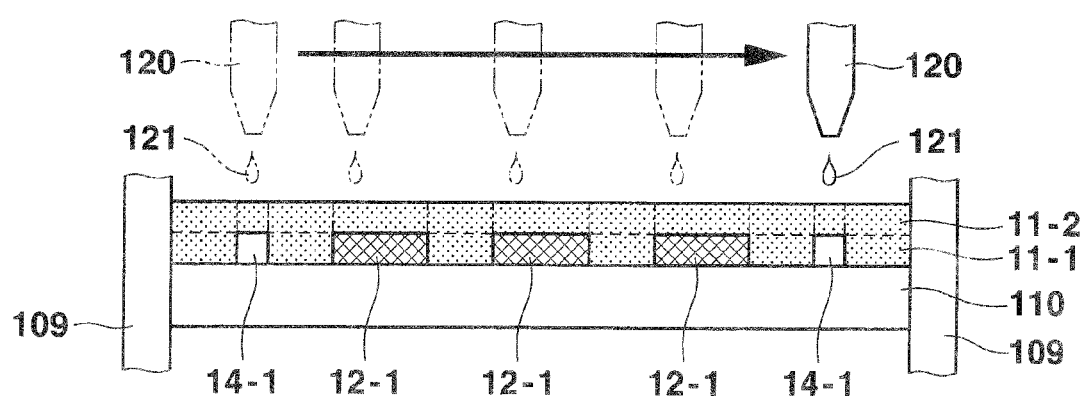

As shown in FIG. 3E, the binder discharging unit 120 then scans in accordance with the shaped object hierarchical data and the tray hierarchical data of the second layer from the reference plane among the shaped object hierarchical data and the tray hierarchical data. At the same time, the binder 121 is discharged to regions of the powder material layer 11-2 of the second layer corresponding to the hierarchical data. This binder 121 is cured. Consequently, as shown in FIG. 4A, the powder material of the powder material layer 11-2 is bound and cured in the regions where the binder 121 has infiltrated, and a combination 12-2 corresponding to the hierarchical shape of the second layer of the shaped objects and a combination 14-2 corresponding to the hierarchical shape of the second layer of the pillars of the tray are formed.

In this case, the combinations 12-2 and 14-2 of the powder material layer 11-2 of the second layer formed in the regions that planarly overlap the combinations 12-1 and 14-1 formed in the powder material layer 11-1 of the first layer are formed when the shaping stage 110 is viewed in plan from above the drawing. At the same time, the dropped binder 121 also reaches the combinations 12-1 and 14-1 of the first layer. Thus, the combination 12-1 of the first layer and the combination 12-2 of the second layer are cured to be bound, together, and the combination 14-1 of the first layer and the combination 14-2 of the second layer are cured to be bound together. That is, in the region where the combination of the lower layer and the combination of the upper layer are formed to planarly overlap each other, the combinations of the upper and lower layers are formed as one combination as a result.

This combination stacking step (SI13) is repeated. Thus, as shown in FIG. 4B, the shaping stage 110 descends by the thickness of a powder material layer 11-3 of a third layer in the tank 109 together with the powder material layers 11-1 and 11-2. The powder material layer 11-3 of the third layer is then deposited on the powder material layer 11-2 of the second layer. In accordance with the shaped object hierarchical data for the first to uppermost (third in the drawing) layers of the shaped objects, shaped objects 12 of the first stage having the combinations 12-1 to 12-3 are stacked and formed as one in the powder material layers 11-1 to 11-3. The powder material layer 11-3 of the third layer is a layer for forming a powder material layer 11-4, and is also a layer for forming a clearance between the combinations 12-1 to 12-3 and the tray body 13 formed later. As shown in FIG. 4C, the shaping stage 110 then descends by the thickness of the powder material layer 11-4 of the fourth layer in the tank 109 together with the powder material layers 11-1 to 11-3. The powder material layer 11-4 of the fourth layer is then deposited on the powder material layer 11-3 of the third layer. At the same time, as shown in FIGS. 4B and 4C, the pillars 14 of the tray of the first stage having the combinations 14-1 to 14-4 are stacked and formed as one in the powder material layers 11-1 to 11-4 in accordance with the tray hierarchical data for the first to uppermost (fourth in the drawing) layers of the pillar of the tray. Moreover, as shown in FIG. 4D, the shaping stage 110 descends by the thickness of a powder material layer 11-5 of the fifth layer in the tank 109 together with the powder material layers 11-1 to 11-4, and the powder material layer 11-5 of the fifth layer is deposited on the powder material layer 11-4 of the fourth layer. In accordance with the tray hierarchical data of the tray body (the fifth layer in the drawing), the tray body 13 of the first stage having the combinations supported by the pillars 14 is stacked and formed in the powder material layer 11-5. Although the tray body 13 is supported by the lower pillars 14, the tray body 13 may be bound to the pillars 14, or may be only mounted on the pillars 14 without being bound to the pillars 14 so that the manufactured shaped objects 12 can be easily taken out from the tank 109. Both the tray body 13 and the pillars 14 are disposed to have an uncured powder material between the tray body 13 and the pillars 14 and the shaped object 12 of the same stage. Here, the tray body 13 has a flat plate structure in which the upper side and lower side thereof are in communication with, each other via a fine mesh or lattice openings, for example, as shown in FIG. 7 so that the uncured powder material covering the shaped objects and the tray will be easily discharged in the later-described powder removing process. The openings of the tray body 13 have such an area and shape that allow powder of the powder material to easily pass through the openings and that prevent the combinations or the shaped, objects disposed on the top of the tray body 13 from passing through the openings.

Figure 5A:
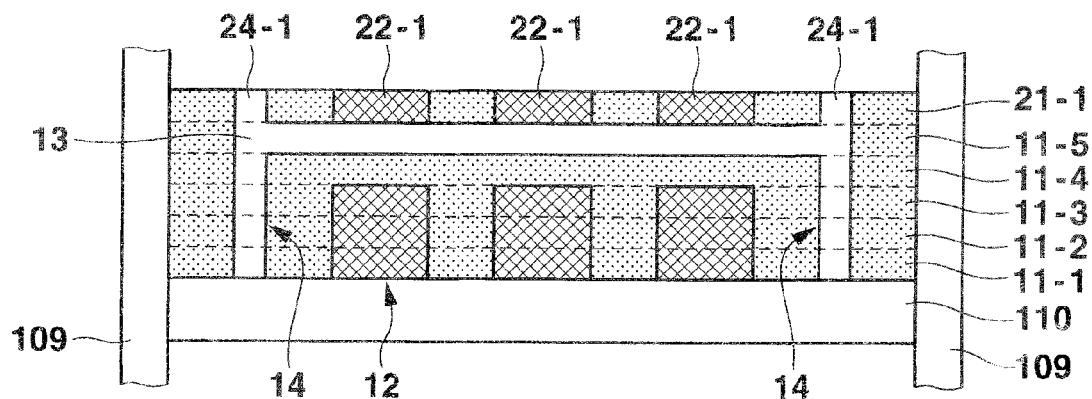
FIGS. 5A, 5B, and 5C are schematic process views (No. 3) showing how the shaped objects and the tray are formed in the shaped object/support member stack shaping process according to the first embodiment.
Figure 5B:
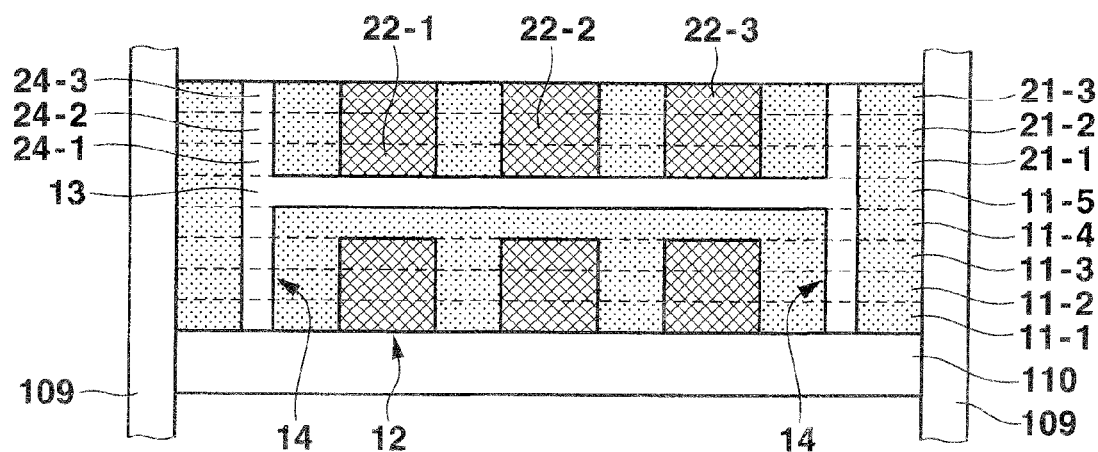
Figure 5C:
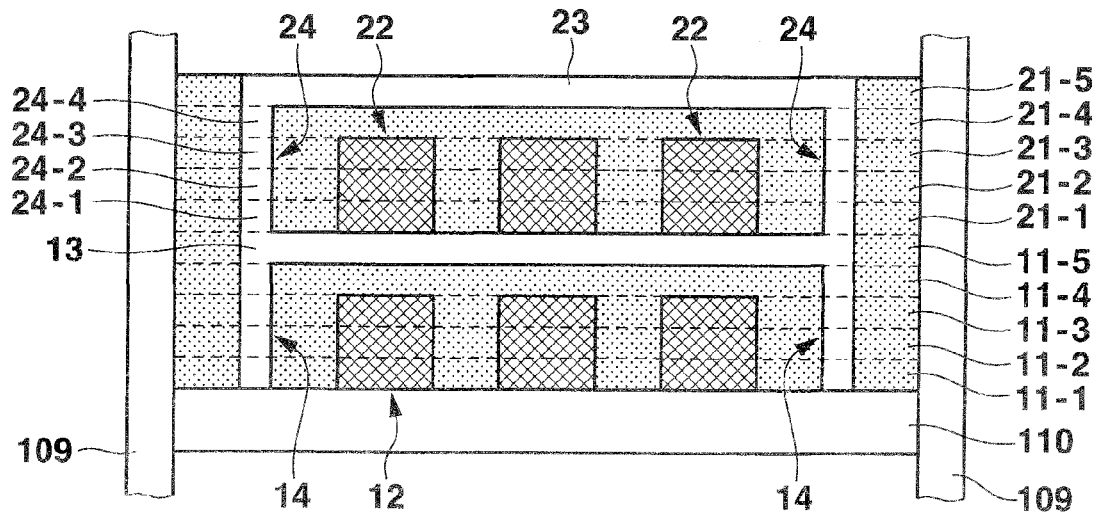

In the shaped object/tray stacking step (S114), the combination stacking step (S113) is then repeated to stack one stage of shaped objects and a tray having combinations for the respective layers to form stages of shaped objects and trays. More specifically, as shown in FIG. 5A to FIG. 5C, on the upper surfaces of the powder material layers 11-1 to 11-5 in which the shaped object 12, the tray body 13, and the pillars 14 of the first stage on the shaping stage 110 are formed, shaped objects 22 of the second stage having combinations 22-1 to 22-3 are stacked and formed as one in powder material layers 21-1 to 21-3 in accordance with the shaped object hierarchical data for the first to third, layers. At the same time, in accordance with the tray hierarchical data for the first to fourth layers, the pillars 24 of the tray of the second stage having combinations 24-1 to 24-4 are stacked and formed as one in the powder material layers 21-1 to 21-4. Moreover, in accordance with the tray hierarchical data for the fifth layer, the tray body 23 of the second stage having the combinations joined to the pillars 24 is stacked and formed in a powder material layer 21-5.

This shaped object/tray stacking step (S114) is repeated. Thus, as shown in FIG. 6A and FIG. 6B, the shaped objects 12, 22, and 32, the tray bodies 13, 23, and 33, and the pillars 14, 24, and 34 of the first stage to the stage one stage lower than the uppermost stage (the third stage in the drawing) are stacked and formed in the powder material layers 11-1 to 11-5, 21-1 to 21-5, and 31-1 to 31-5, in accordance with the shaped object hierarchical data and the tray hierarchical data. Here, the pillars 14, the tray body 13, the pillars 24, the tray body 23, the pillars 34, and the tray body 33 that are sequentially stacked are stacked and formed as one to constitute a tray 10A.

In the shaped object stacking step (S115), the uppermost shaped objects are then formed in accordance with the shaped object hierarchical data alone, out of the shaped object/tray stacking step (S114). More specifically, as shown, in FIG. 6B, on the upper surface of the powder material layer 31-5 in which the tray body 33 of the uppermost stage of the tray 10A on the shaping stage 110, the shaped objects 42 of the uppermost (fourth in the drawing) stage having combinations 42-1 to 42-3 are stacked and formed as one in powder material layers 41-1 to 41-3 in accordance with the shaped object hierarchical data for the first to third layers.

Thus, as a result of the steps of the shaped object/support member stack shaping process (S103), as shown in FIG. 6B and FIG. 7, the tray 10A having the tray bodies 13, 23, and 33 and the pillars 14, 24, and 34 is stacked and formed as one in a powder material 101 stacked on the shaping stage 110 by the cured powder material 101, and the shaped objects 22, 32, and 42 of the second stage to the uppermost stage are mounted and formed on the tray bodies 13, 23, and 33 of the respective stages or the tray 10A. The shaped object 12 of the first stage is mounted and formed on the upper surface of the shaping stage 110, and the upper side of the shaped object 12 is covered by the tray body 13 and the pillars 14 of the first stage. At the same time, the shaped objects 12, 22, 32, and 42 formed in the respective stages and the tray 10A are buried and formed in the powder material 101 having the uncured (unbound) powder material layers 11-1 to 11-5, 21-1 to 21-5, 31-1 to 31-5, and 41-1 to 41-3 that are stacked on the shaping stage 110 during a manufacturing process and immediately after the completion of manufacturing, and are supported by the uncured powder material 101 that fills the space therearound. This prevents tipping of and damage to even an eccentric shaped object or a shaped object having an overhung portion made of a cured upper material layer laterally projecting relative to the cured lower powder material layer.

In the powder removing process (S104), the uncured powder material 101 stacked on the shaping stage 110 is then removed to expose the shaped objects 12, 22, 32, and 42. More specifically, as shown in FIG. 8A, powder discharge holes 110*h* provided in the shaping stage 110 are opened, and the powder material 101 is discharged from the powder discharge holes 110*h* by its weight. The powder material 101 may be sucked and discharged by an unshown suction mechanism. Here, the tray bodies 13, 23, and 33 on which the shaped objects 22, 32, and 42 are mounted have the flat plate structure in which the mesh or lattice openings are provided as described above (see FIG. 7). Therefore, the uncured powder material 101 deposited on the tray bodies 13, 23, and 33 fall down via these openings, and discharged from the powder discharge holes 110*h* of the shaping stage 110. At the same time, the shaped objects 22, 32, and 42 of the second stage to the uppermost stage (fourth stage) are exposed while being mounted on and supported by the upper surfaces of the tray bodies 13, 23, and 33 of the respective stages of the tray 10A. The shaped object 12 of the first stage is exposed while being mounted on and supported by the upper surface of the shaping stage 110. It is also possible to shake the tank 109 and the shaping stage 110 to drop the uncured powder material 101 which has not dropped down and which remains on the shaped objects 12, 22, 32, and 42 or on the tray 10A.

Although the powder material 101 on the shaping stage 110 is discharged via the powder discharge holes 110h provided in the shaping stage 110 in the case described according to the present embodiment, the present invention is not limited thereto. In the three-dimensional shaping method according to the present embodiment, the powder material 101 stacked on the shaping stage 110 may be blown off by wind pressure or may be removed by sound wave vibrations.

In the shaped object takeout process (S105), the shaped objects 12, 22, 32, and 42 exposed from the powder material 101 by the powder removing process (S104) are then sequentially taken out. More specifically, as shown in FIG. 8B, the exposed shaped objects 12, 22, 32, and 42 are sequentially taken out from the tray 10A and the shaping stage 110 after the removal of all the powder material 101 from the shaping stage 110 or during the removal of the powder material 101 from the shaping stage 110.

Now, a comparative example is shown to verify the advantageous effects of the three-dimensional shaping method described, above. Here, a three-dimensional shaping method as the comparative example is first-shown to verify its problems, and then the characteristics and advantageous effects of the three-dimensional shaping method according to the present embodiment are described.

Figure 9A:
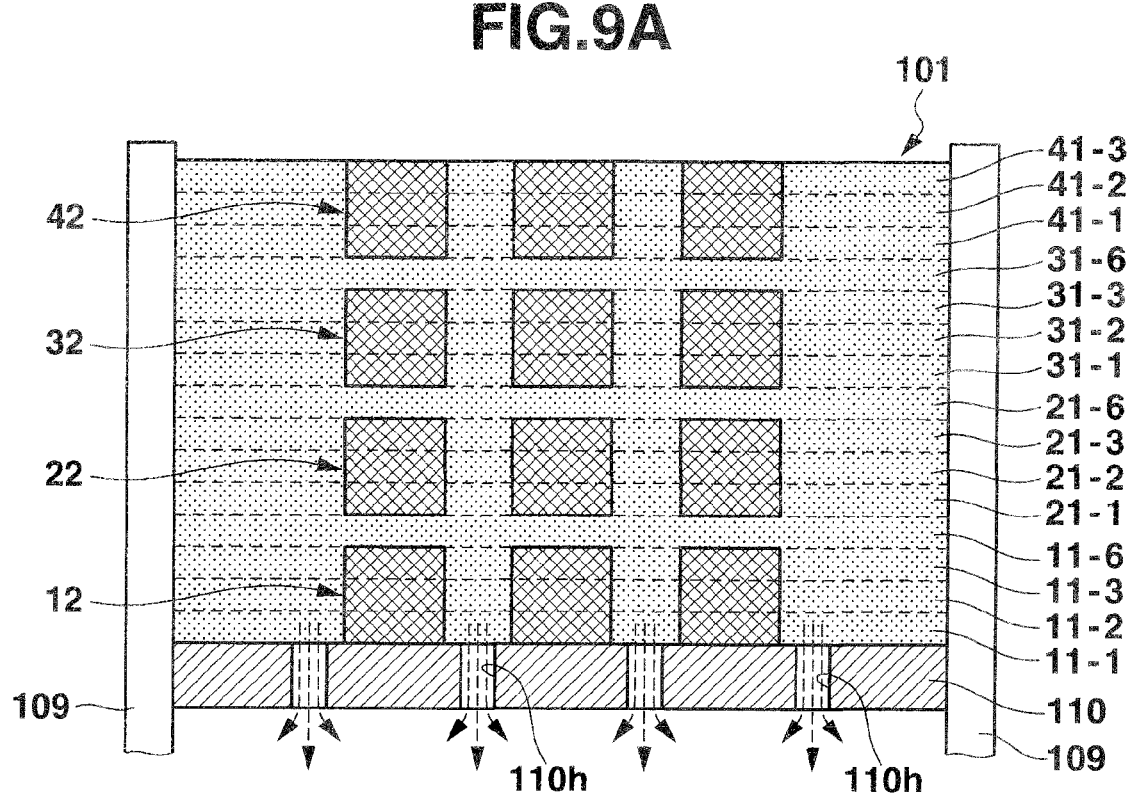
FIGS. 9A and 9B are schematic process views illustrating a three-dimensional shaping method, according to a comparative example.
Figure 9B:
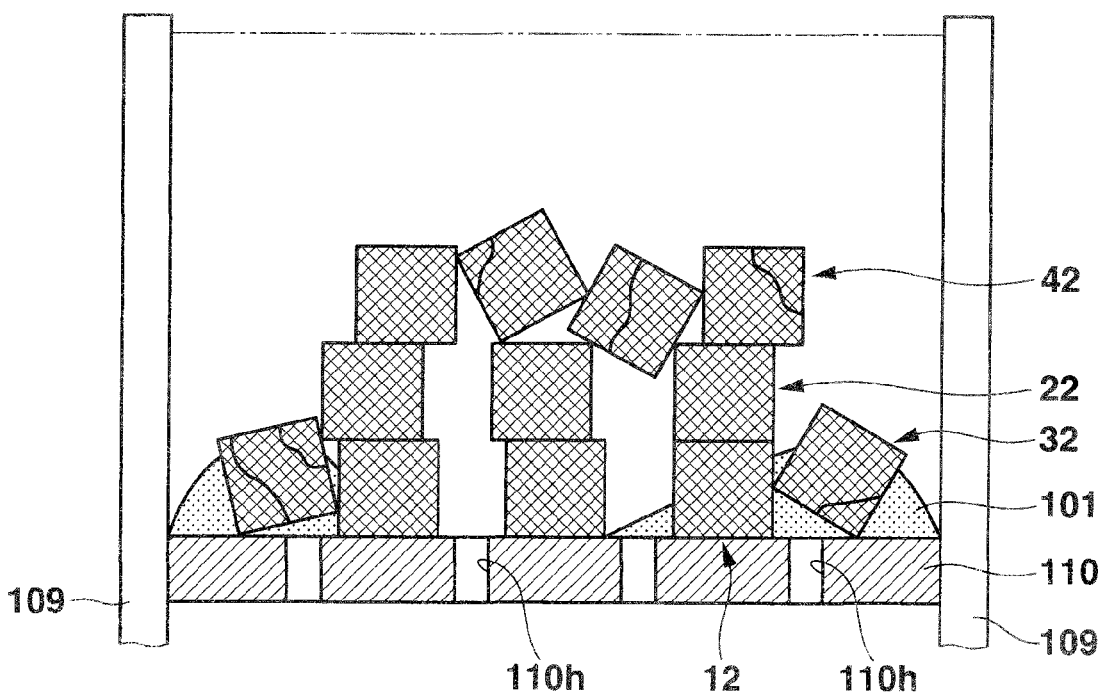

FIGS. 9A and 9B are schematic process views illustrating the three-dimensional shaping method according to the comparative example. Here, for ease of explanation, components equivalent to those according to the above-described embodiment of the present invention are denoted by the same reference signs and described.

In the three-dimensional shaping method according to the comparative example or the present invention, for example, as shown in FIG. 9A, one layer (the first layer of the first stage) of a powder material layer 11-1 is first formed on the upper surface of the shaping stage 110. In accordance with hierarchical shape data (shaped object, hierarchical data) regarding shaped objects generated by three-dimensional CAD data, the powder material layer 11-1 is then selectively cured to form a combination corresponding to the shaped object hierarchical data.

This step of forming a combination in one layer of a powder material layer is repeated. Thus, shaped objects 12 of the first stage having a cured powder material 101 are stacked and formed as one in powder material layers 11-1 to 11-3 in accordance with the shaped object hierarchical data for the first to uppermost (third in the drawing) layers of the shaped objects. In order to prevent the shaped object 12 of the first stage from being bound to a shaped object 22 of the second stage, a powder material layer (binding prevention layer) 11-6 is then formed on the upper surface of the powder material layer 11-3.

Furthermore, this step of forming one stage of the shaped objects having the combinations for the respective layers is repeated. Thus, as shown in FIG. 9A, the shaped objects 12, 22, 32, and 42 of the first stage to the uppermost (fourth in the drawing) stage are formed in the powder material layers 11-1 to 11-3, 21-1 to 21-3, 31-1 to 31-3, and 41-1 to 41-3 stacked on the shaping stage 110. Moreover, the shaped objects 12, 22, 32, and 42 of the respective stages are stacked and formed via the powder material layers 11-6, 21-6, and 31-6.

In this three-dimensional shaping method as the comparative example, if the shaped objects 12, 22, 32, and 42 of the respective stages stacked and formed on the shaping stage 110 are taken out when buried in the powder material layers, for example, as shown in FIG. 9A, the shaped objects 12, 22, 32, and 42 tend to bump into each other or tend to be damaged by mechanical stress inadvertently applied thereto. Even if the powder material 101 is sucked and discharged from the powder discharge holes 110h provided in the shaping stage 110 and removed from the space around the shaped objects 12, 22, 32, and 42, the shaped objects 22, 32, and 42 of the upper stages may fall down on the shaping stage 110, or the shaped objects 12, 22, 32, and 42 may contact each other, as shown in FIG. 9B. This leads to the problem of the decrease of production yield caused by damage to the shaped objects 12, 22, 32, and 42. Another problem is that the shaped objects 12, 22, 32, and 42 which have irregularly fallen on the shaping stage 110 block the powder discharge holes 110h, and the powder material 101 is not sufficiently discharged and remains so that the shaped objects 12, 22, 32, and 42 become difficult to take cut and productivity decreases.

Furthermore, as shown in FIG. 9A, if the shaped objects 12, 22, 32, and 42 of the respective stages are arranged and formed to planarly overlap each other when the shaping stage 110 is viewed in plan from above the drawing, a binder is only dropped and cured in regions substantially equivalent to the powder material layers 11-1 to 11-3, 21-1 to 21-3, 31-1 to 31-3, and 41-1 to 41-3 in which the shaped objects 12, 22, 32, and 42 are formed. The powder material layer in which the binder has been dropped is higher in relative density than the powder material layer in which the binder has not been dropped, and tends to sink into the uncured powder material layer. This leads to a difference in the flatness of the powder material layers between the cured region and the uncured region, which causes flexure and strain. Therefore, the shaped objects of the upper stages on which the powder material layers are stacked are more subject to the flexure and strain of the powder material layers. In consequence, an original three-dimensional shape based, on three-dimensional CAD data cannot be obtained.

Thus, in the three-dimensional shaping method according to the present embodiment, the tray 10A on which the shaped objects 22, 32, and 12 are mounted is formed simultaneously with the shaped objects 12, 22, and 32 of the respective stages, as described above. The spaces between the tray bodies 13, 23, and 33 are formed to be greater than the height of the shaped objects 12, 22, and 32 by defining the length of the pillars 14, 24, and 34 (more specifically, the number of stacked powder material layers). Moreover, the tray bodies 13, 23, and 33 have the flat plate structure in which the mesh or lattice openings are provided to facilitate the discharge of the powder material 101.

According to this three-dimensional shaping method, when the powder material 101 on the shaping stage 110 is removed to take out the shaped objects 12, 22, 32, and 42, the shaped objects 22, 32, and 42 are mounted on and supported by the tray bodies 13, 23, and 33 of the respective stages of the tray 10A as shown in FIG. 8A and FIG. 8B. Therefore, it is possible to prevent the shaped objects 12, 22, 32, and 42 from failing down on the shaping stage 110 or contacting each other and being damaged or broken without even the intervention of the powder material layers. Moreover, the shaped objects 12, 22, 32, and 42 are satisfactorily exposed while being mounted on and supported by the shaping stage 110 and the tray bodies 13, 23, and 33 of the respective stages. Thus, the shaped objects 12, 22, 32, and 42 can be easily taken out from the respective stages of the tray 10A.

Furthermore, as the tray 10A supports the shaped objects 12, 22, 32, and 42 in a stacked state, the shaped objects 12, 22, 32, and 42 do not sink into the powder material layers. The upper surface of the shaping stage 110 and the upper surfaces of the tray bodies 13, 23, and 33 of the respective stages of the tray 10A serve as the reference planes for forming the shaped objects 12, 22, 32, and 42 of the respective stages, and the flexure and strain of the powder material layers 11-1 to 11-3, 21-1 to 21-3, 31-1 to 31-3, and 41-1 to 41-3 can be inhibited. Consequently, the shaped objects 12, 22, 32, and 42 having the original three-dimensional shape based on the three-dimensional CAD data can be satisfactorily formed.

Hence, according to the present embodiment, damage to the shaped objects can be inhibited and the shaped objects can be easily taken out, and production yield and productivity can be improved, when the powder-stacking method is used to form a large volume of three-dimensional shaped objects.

In the case described above according to the present embodiment, the combinations to constitute the shaped objects 12, 22, 32, and 42 are formed so that the bottom surfaces of the shaped objects 12, 22, 32, and 42 are in direct contact with the upper surface of the shaping stage 110 and the upper surfaces of the tray bodies 13, 23, and 33 of the respective stages of the tray 10A. Here, the upper surface of the shaping stage 110 and the bottom surface of the shaped object 12 or the upper surfaces of the tray bodies 13, 23, and 33 and the bottom surfaces of the shaped objects 22, 32, and 42 may tend to be bound to each other, and it may not be possible to satisfactorily take out the shaped objects 12, 22, 32, and 42. In this case, a binding prevention layer having the same uncured powder material as the powder material layers may be only formed on the upper surface of the shaping stage 110 and the upper surfaces of the powder material layers 11-5, 21-5, and 31-5 in which the tray bodies 13, 23, and 33 are formed before the formation of the powder-material layers 11-1, 21-1, 31-1, and 41-1 of the first layers of the respective stages. The thickness of the binding prevention layer is set so that the binder dropped on the powder material layer of the first layer on the binding prevention layer may not reach the tray body under the binding prevention layer. For example, the thickness of the binding prevention layer is set to about 0.1 mm or more as in the case with the above-mentioned powder material layers 11-1 to 11-5, 21-1 to 21-5, 31-1 to 31-5, and 41-1 to 41-3. More specifically, the thickness of the binding prevention layer is preferably set to the integral multiple of the reference thickness of one layer of the powder material layers 11-1 to 11-5, 21-1 to 21-5, 31-1 to 31-5, and 41-1 to 41-3. Thus, the thickness of the binding prevention layer is set to the thickness which is equal to or which is the integral multiple of the thickness of the powder material layers 11-1 to 11-5, 21-1 to 21-5, 31-1 to 31-5, and 41-1 to 41-3 for forming the shaped objects 12, 22, 32, and 42. Accordingly, shaping conditions (e.g. numerical settings) in the three-dimensional shaping apparatus do not need to be changed, and operation control and input operation can be simplified. The shaped object may be slightly bound to the tray body located immediately under this shaped object so that the shaped object can be easily separated from the tray body by the application of small mechanical stress. In this case, it is possible to prevent the shaped object from tipping when the powder material 101 collides with the shaped object and discharged from the powder discharge holes 110*h*.

Consequently, according to the present invention, damage to the shaped objects can be inhibited.

Second Embodiment

Now, the second embodiment of the three-dimensional shaping method according to the present invention is described.

In the case described above according to the first embodiment, the tray 10A formed simultaneously with the shaped objects 12, 22, 32, and 42 has an integral configuration in which the tray bodies 13, 23, and 33 and the pillars 14, 24, and 34 of the respective stages are alternately stacked as shown in FIG. 7. In the second embodiment, the tray 10A is configured to be separable stage by stage.

Figure 10A:
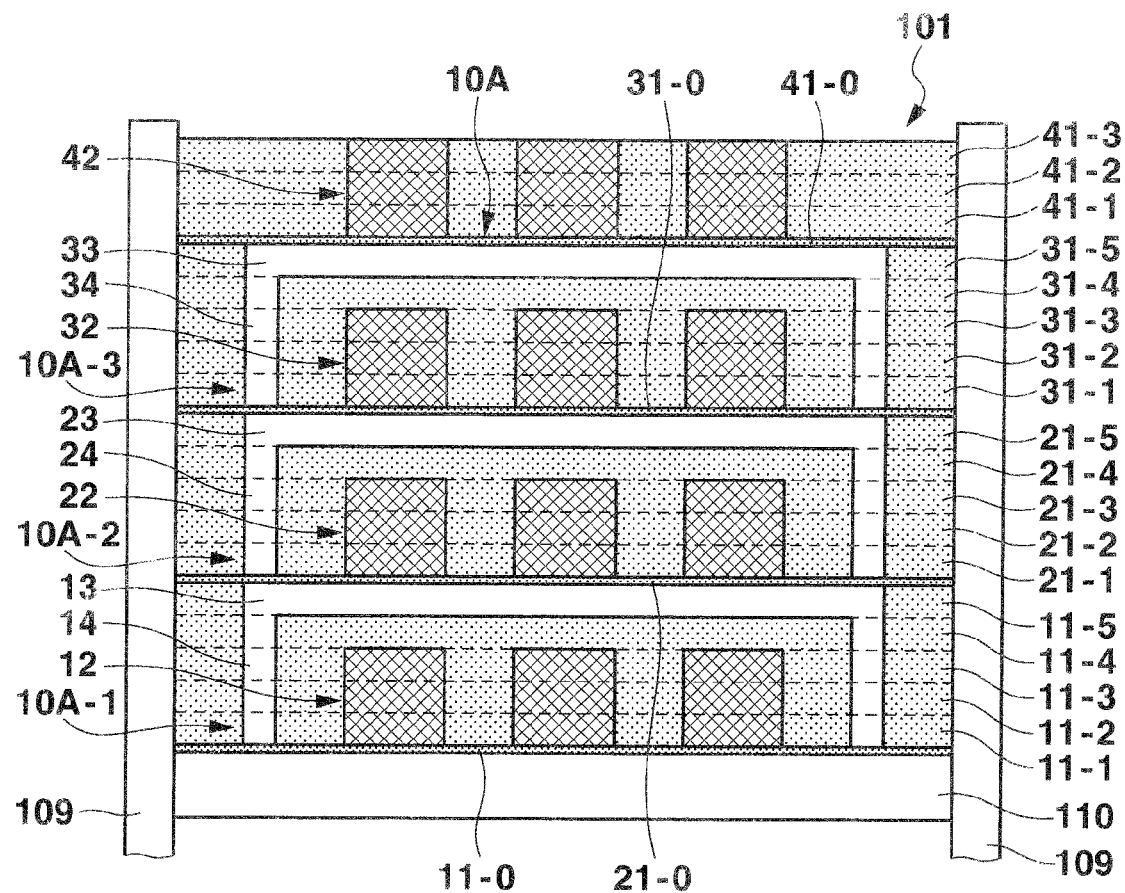
FIGS. 10A and 10B are schematic views showing one configuration example of shaped objects and a tray that are formed in a second embodiment of the three-dimensional shaping method according to the present invention.
Figure 10B:
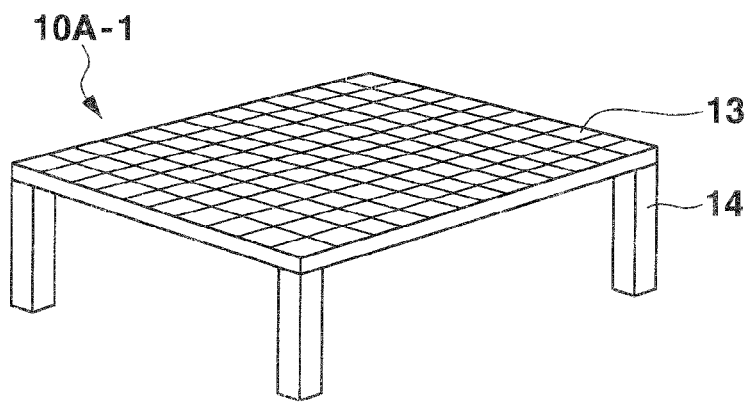
Figure 11:
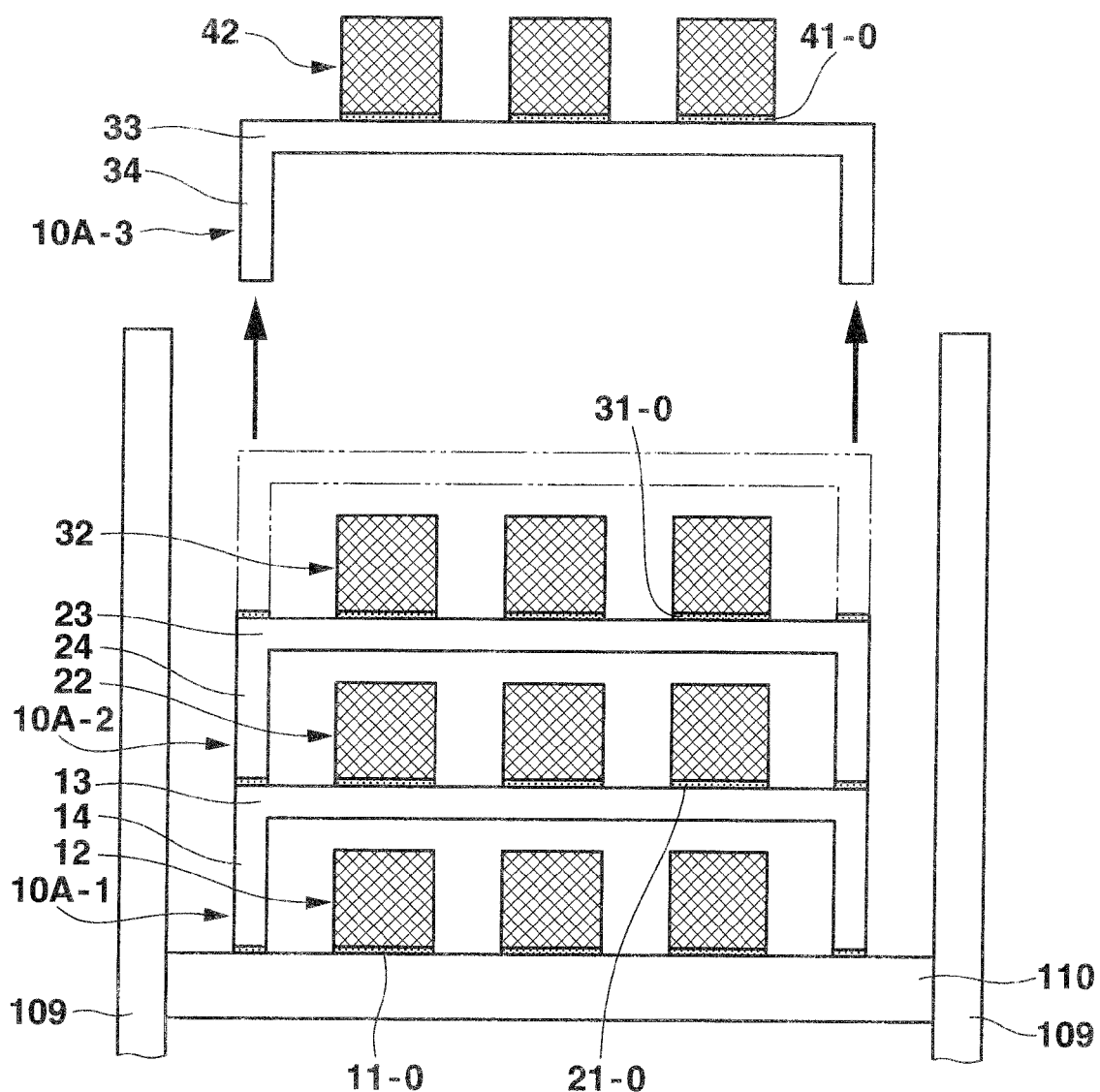
FIG. 11 is a schematic process view showing how the shaped objects are taken out in a shaped object takeout process according to the second embodiment.

FIG. 10A and FIG. 10B are schematic views showing one configuration example of shaped objects and a tray that are formed in the second embodiment of the three-dimensional shaping method according to the present invention. FIG. 10A is a schematic process view showing how the shaped objects and the tray are formed according to the present embodiment. FIG. 10B is a schematic configuration diagram showing an example of the tray of each stage (one stage) formed according to the present embodiment. FIG. 11 is a schematic process view showing how the shaped objects are taken out in a shaped object takeout process according to the second embodiment. Processes, processing steps, and components that are equivalent to those according to the above-described first embodiment are denoted by the same reference signs and properly described with reference to FIG. 3A to FIG. 3E, FIG. 4A to FIG. 4D, FIG. 5A to FIG. 5C, FIG. 6A and FIG. 6B, FIG. 7, and FIG. 8A and FIG. 8B.

In the second embodiment of the three-dimensional shaping method according to the present invention, in the shaped object/support member stack shaping process (S103) shown in the above-described first embodiment (see FIG. 1 and FIG. 2), the shaped objects 12, 22, 32, and 42 are mounted on the respective stages of the tray 10A and stacked and formed in stages in the powder material 101 having the powder material layers 11-1 to 11-5, 21-1 to 21-5, 31-1 to 31-5, and 41-1 to 41-3 stacked on the shaping stage 110 as shown in FIG. 10A. The tray 10A is formed to be separable stage by stage.

More specifically, in the shaped object/support member stack shaping process (S103), in order to prevent the shaped object 12 of the first stage and the pillars 14 of a tray 10A-1 from being bound to the shaping stage 110, a binding prevention layer 11-0 having an uncured powder material is first formed on the entire upper surface of the shaping stage 110 by thinly and uniformly spreading a powder material. Although the binding prevention layer is made of the same material as the powder material layer, the binding prevention layer may be made of a material which is different from the material of the powder material layer and which is not easily cured or is not cured under the conditions for curing the powder material layer. The powder material layer forming step (S111), the combination forming step (S112), and the combination stacking step (S113) that are shown in FIG. 2 are then conducted no stack and form the shaped object 12 of the first stage as one in the powder material layers 11-1 to 11-3. At the same time, the pillars 14 of the first stage are stacked and formed as one in the powder material layers 11-1 to 11-4, and the tray body 13 of the first stage joined to the pillars 14 is stacked and formed in the powder material layer 11-5. That is, as shown in FIG. 10B, the tray 10A-1 of the first stage having the pillars 14 and the tray body 13 are stacked and formed as one.

In order to prevent the shaped object 22 of the second stage and the pillars 24 of a tray 10A-2 from being bound, to the tray 10A-1 of the first stage, a binding prevention layer 21-0 having an uncured powder material is formed on the entire upper surface of the powder material layer 11-5 in which the tray body 13 is formed, that is, on the upper surface of the tray body 13 and the upper surface of the uncured powder material layer 11-5. As in the first stage, the shaped objects 22 of the second stage are stacked and formed as one in the powder material layers 21-1 to 21-3, and the pillars 24 of the second stage are stacked and formed as one in the powder material layers 21-1 to 21-4, and moreover, the tray body 23 of the second stage joined to the pillars 24 is stacked and formed in the powder material layer 21-5. That is, as in the first stage, the tray 10A-2 of the second stage having the pillars 24 and the tray body 23 is stacked and formed as one.

Thus, after the binding prevention layer having the uncured powder material is formed, a series of processing to conduct the shaped object/tray stacking step (S114) shown in FIG. 2 is repeated, Consequently, as shown in FIG. 10A, the shaped objects 12, 22, and 32 of the first to third stages and the trays 10A-1 to 10A-3 of the respective stages are stacked and formed in the powder material layers 11-1 to 11-5, 21-1 to 21-5, and 31-1 to 31-5. Here, the sequentially stacked trays 10A-1 to 10A-3 are configured to be separable stage by stage by the intervention of the binding prevention layers 11-0 to 31-0 having the uncured powder material in the respective stages over the entire powder material layer.

In order to prevent the shaped object 42 of the uppermost (fourth in the drawing) stage from being bound to the tray 10A-3 of the third stage, a binding prevention layer 41-0 having an uncured powder material is then formed on the upper surface of the powder material layer 31-5 in which the tray body 33 is formed. The shaped object stacking step (S115) shown in FIG. 2 is then conducted to form the shaped object 42 of the fourth stage in the powder material layers 41-1 to 41-3.

Thus, according to the present embodiment, as shown in FIG. 10A, the tray 10A-1 having the tray body 13 and the pillars 14, the tray 10A-2 having the tray body 23 and the pillars 24, and the tray 10A-3 having the tray body 33 and the pillars 34 are stacked and formed in the respective stages by the cured powder material 101 in the powder material 101 stacked on the shaping stage 110. Moreover, the shaped objects 12, 22, 32, and 42 of the respective stages are mounted and formed on the shaping stage 110 and on the trays 10A-1 to 10A-3 of the respective stages. The binding prevention layer 11-0 prevents the shaping stage 110 from being bound to the tray 10A-1 and to the shaped object 12. The binding prevention layer 21-0 prevents the tray 10A-1 from being bound to the tray 10A-2 and to the shaped object 22. The binding prevention layer 31-0 prevents the tray 10A-2 from being bound to the tray 10A-3 and to the shaped object 32. The binding prevention layer 41-0 prevents the tray 10A-3 from being bound to the shaped object 42. Therefore, as the binding prevention layers 11-0 to 41-0 are formed in the lowermost layers of the respective stages (i.e. between the respective stages), the binding of the shaping stage 110, the trays 10A-1 to 10A-3 of the respective stages, and the shaped objects 12, 22, 32, and 42 of the respective stages is prevented so that the trays 10A-1 to 10A-3 of the respective stages are stacked to be separable.

In the powder removing process (S104) shown in FIG. 1, the uncured powder material 101 stacked on the shaping stage 110 is removed to expose the shaped objects 12, 22, 32, and 42 of the respective stages. At the same rime, the shaped objects 12, 22, 32, and 42 are exposed while being mounted on and supported by the shaping stage 110 and the trays 10A-1 to 10A-3 of the respective stages.

In the shaped object takeout process (S105) shown in FIG. 1, all the powder material 101 is removed from the shaping stage 110. Moreover, the exposed shaped objects 12, 22, 32, and 42 are sequentially taken out from the trays 10A-1 to 10A-3 and the shaping stage 110 after or during the removal of the binding prevention layers 11-0, 21-0, 31-0, and 41-0 immediately under the shaped objects 12, 22, 32, and 42, and the removal of the binding prevention layers 11-0, 21-0, 31-0, and 41-0 immediately under the pillars 14, 24, and 34 except for the binding prevention layers 11-0, 21-0, and 31-0. In this case, the shaped objects 22, 32, and 42 may be independently taken out from the trays 10A-1 to 10A-3 of the respective stages, or the shaped objects 22, 32, and 42 may be collectively taken out together with the separable trays 10A-1 to 10A-3 of the respective stages. That is, as shown in FIG. 11, the shaped objects 42 of the uppermost (fourth) stage may be collectively taken out from the shaping stage 110 (the three-dimensional shaping apparatus) while being mounted on and supported by the tray 10A-3 of the third stage. The shaped objects 32 of the third stage may be collectively taken out while being mounted on and supported by the tray 10A-2 of the second stage. The shaped objects 22 of the second stage may be collectively taken cut while being mounted on and supported by the tray 10A-1 of the first stage.

In the present embodiment, when the binding prevention layers 11-0 to 41-0 formed in the lowermost layers of the respective stages are made of the same material as the powder material layer, the thickness of the binding prevention layers 11-0 to 41-0 is set so that the binder dropped on the powder material layer of the first layer on the binding prevention layer may not reach the tray body under the binding prevention layer. For example, the thickness of the binding prevention layers is set to about 0.1 mm or more as in the above-described first embodiment. That is, the thickness of the binding prevention layers 11-0 to 41-0 is set to the thickness which is equal to or which is the integral multiple of the reference thickness of one layer of the powder material layers 11-1 to 11-5, 21-1 to 21-5, 31-1 to 31-5, and 41-1 to 41-3. When the binding prevention layers 11-0 to 41-0 are made of a material which is different from the material of the powder material layers and which is not easily cured or is not cured under the conditions for curing the powder material layers, the thickness of the binding prevention layers 11-0 to 41-0 is net particularly limited. However, the particle diameter of the powder is preferably small, so that she powder particles are densely deposited to prevent the binder from reaching the tray body under the binding prevention, layer through the powder particles in the binding prevention layer. Instead of being in powder form, each of the binding prevention layers 11-0 to 41-0 may be a sheet having an opening that allows the passage of the powder of the powder material in accordance with the openings provided in the tray bodies 13, 23, and 33. In this case, its surface is preferably fluorinated.

Thus, as in the above-described first embodiment, in the three-dimensional shaping method according to the present embodiment, when, the powder material 101 on the shaping stage 110 is removed to take out the shaped objects 12, 22, 32, and 42, the shaped objects 12, 22, 32, and 42 are mounted on and supported by the trays 10A-1, 10A-2, and 10A-3 of the respective stages. Therefore, it is possible to prevent the shaped objects 12, 22, 32, and 42 from falling down on the shaping stage 110 or contacting each other and being damaged or broken. Moreover, the trays 10A-1, 10A-2, and 10A-3 of the respective stages can be independently taken out, so that if the tray of the upper stage is taken out, the shaped objects mounted on the tray of the lower stage are exposed and easily taken out. Alternatively, the trays 10A-1, 10A-2, and 10A-3 of the respective stages ace separated so that the shaped objects 12, 22, 32, and 42 can be easily taken out collectively together with the trays 10A-1, 10A-2, and 10A-3.

Furthermore, when the shaped objects 12, 22, 32, and 42 are formed in a stacked state, the upper surface of the shaping stage 110 and the upper surfaces of the trays 10A-1, 10A-2, and 10A-3 of the respective stages serve as the reference planes for forming the shaped objects 12, 22, 32, and 42 of the respective stages, and the flexure and strain of the powder material layers 11-1 to 11-3, 21-1 to 21-3, 31-1 to 31-3, and 41-1 to 41-3 can be inhibited. Consequently, the shaped objects 12, 22, 32, and 42 having the original three-dimensional shape based on the three-dimensional CAD data can be satisfactorily formed.

Hence, according to the present embodiment as well, damage to the shaped objects can be inhibited and the shaped objects can be easily taken out, and production yield and productivity can be improved, when the powder stacking method is used to form a large volume of three-dimensional shaped objects.

Third Embodiment

Now, the third embodiment of the three-dimensional shaping method according to the present invention is described.

In the cases described above according to the first and second embodiments, the trays are formed on the respective stages for the shaped objects stacked and formed in stages, and the shaped objects are mounted on the trays (tray bodies), as shown in FIG. 7, FIG. 10A, and FIG. 10B. In the third embodiment, the adjacent shaped objects of the respective stages are linked to each other by a runner (shaped object support member) and stacked and formed in stages.

Figure 12:
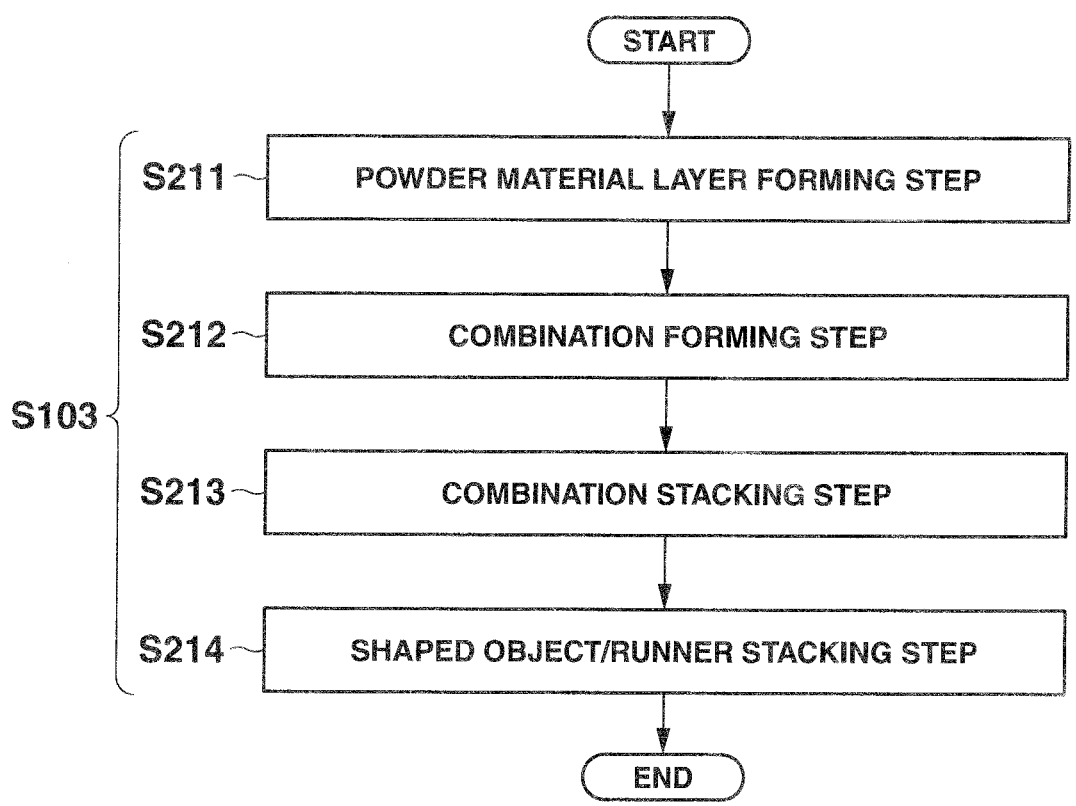
FIG. 12 is a flowchart showing an example of a shaped object/support member stack shaping process in a third embodiment of the three-dimensional shaping method according to the present invention.

FIG. 12 is a flowchart showing an example of a shaped object/support member stack shaping process in the third embodiment of the three-dimensional shaping method according to the present invention. FIGS. 13A to 13D, FIG. 14A to FIG. 14C, and FIG. 15A and FIG. 15B are schematic process views showing how the shaped objects and a tray are formed in the shaped object/support member stack shaping process and the powder material removing process according to the present embodiment. FIG. 16 is a schematic configuration diagram showing an example of the shaped objects and the runner that are formed by the shaped object/support member stack shaping process according to the present embodiment. Here, in FIG. 16, the powder material layers are see-through, and the shaped objects and the tray are only shown for ease of explanation. Processes, processing steps, and components that are equivalent to those according to the above-described first and second embodiments are denoted by the same reference signs and properly described wish reference to FIG. 1, FIG. 2, FIG. 3A to FIG. 3E, FIG. 4A to FIG. 4D, FIG. 5A to FIG. 5C, FIG. 6A and FIG. 6B, FIG. 7, FIG. 8A and FIG. 8B, FIG. 10A and FIG. 10B, and FIG. 11.

As in the case shown in FIG. 1, the third embodiment of the three-dimensional shaping method according to the present invention generally comprises the three-dimensional data preparing process (S101), the shaped object/support member hierarchical data generating process (S102), the shaped object/support member stack shaping process (S103), the powder removing process (S104), and the shaped object take-out process (S105). In the present embodiment, in the shaped object/support member stack shaping process, a plurality of shaped objects are linked to the runner which is the shaped object support member and stacked and formed in stages in the powder material layer stacked on the shaping stage (see FIG. 16).

First, in the three-dimensional data preparing process (S101), three-dimensional CAD data regarding the shaped objects to be shaped in the shaped object/support member stack shaping process (S103) is prepared, as in the first embodiment.

In the shaped object/support member hierarchical data generating process (S102), the shaped object hierarchical data, is then generated on the basis of the three-dimensional CAD data, as in the first embodiment. In the present embodiment, in the shaped object/support member hierarchical data generating process (S102), for a plurality of shaped objects stacked and formed in stages on the shaping stage, hierarchical shape data (hereinafter referred to as "runner hierarchical data" for convenience) is generated regarding layers of the runner for linking and supporting the shaped objects of the respective stages that are sliced (divided) into layers in the same plane as in the case with the above-mentioned shaped object. The shape of the runner will be described later in detail. In the present embodiment, for example, as shown in FIG. 16, there are provided links 15, 25, 35, and 45 which link the adjacent shaped objects 12, 22, 32, and 42 of the respective stages to each other, and pillars 14, 24, 34, and 44 which are connected to the links 15, 25, 35, and 45 and which define the spaces between the shaped objects 12, 22, 32, and 42 of the respective stages. A plurality of stages of these components are configured as one.

In the shaped object/support member stack shaping process (S103), a powder material layer forming step (S211), a combination forming step (S212), a combination stacking step (S213), and a shaped object/runner stacking step (S214) are conducted, as shown in FIG. 12.

Figure 13A:
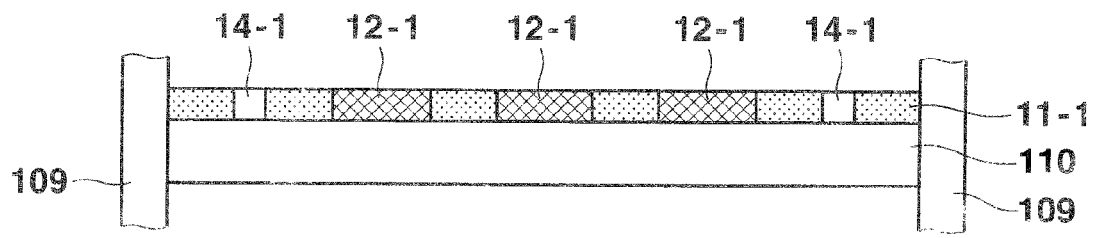
FIGS. 13A, 13B, 13C, and 13D are schematic process views (No. 1) showing how the shaped objects and a tray are formed in the shaped, object/support member stack shaping process and a powder material removing process according to the third embodiment.
Figure 13B:
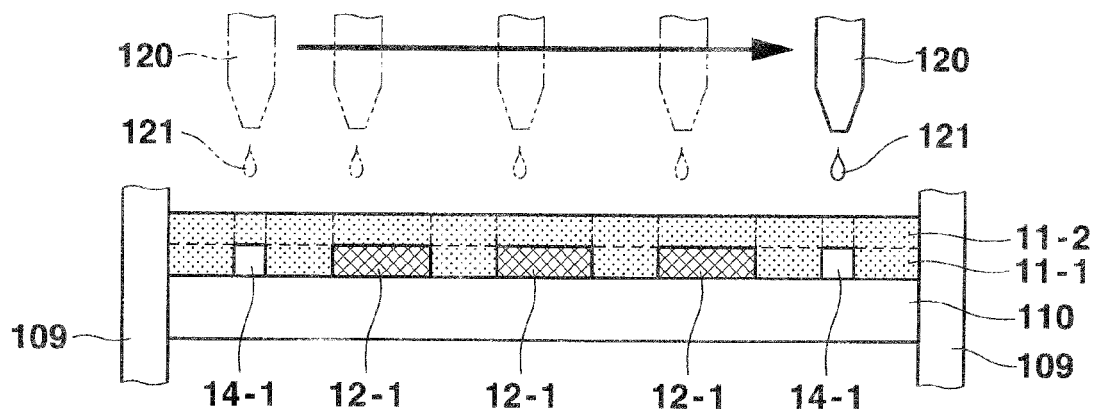

First, in the powder material layer forming step (S211) and the combination forming step (S212), as in the first embodiment, the binder discharging unit 120 scans in accordance with the shaped object hierarchical data and the runner hierarchical data of the first layer for one layer (the first layer of the first stage) of the powder material layer 11-1 formed on the upper surface of the shaping stage 110, as shown in FIG. 13A and FIG. 13B. At the same time, the binder 121 is discharged from the binder discharging unit 120 to selectively cure the powder material layer 11-1 and thereby form the combination 12-1 corresponding to the hierarchical shape of the first layer of the shaped objects, and the combination 14-1 corresponding to the hierarchical shape of the first layer of the pillars of the runner.

Figure 13C:
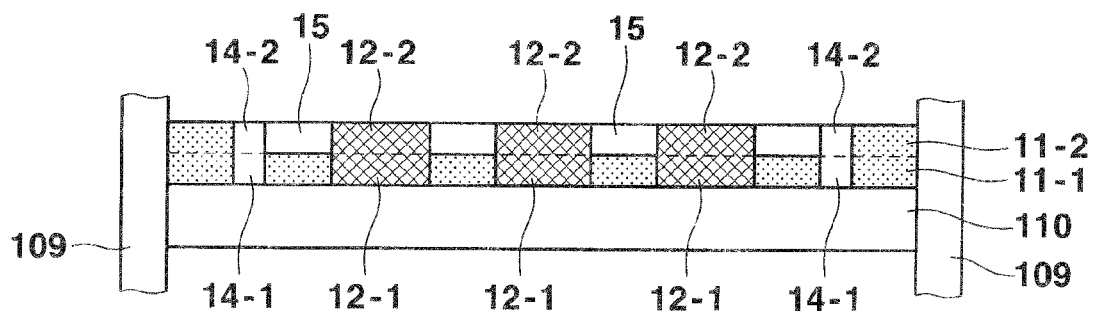

In the combination stacking step (S213), as shown in FIG. 13B and FIG. 13C, the powder material layer 11-2 of the second layer is formed on the powder material layer 11-1 of the first layer, and the binder discharging unit 120 scans in accordance with the shaped object hierarchical data and the runner hierarchical data of the second layer. At the same time, the binder 121 is discharged to selectively cure the powder material layer 11-2 and thereby form the combination 12-2 corresponding to the hierarchical shape of the second, layer of the shaped objects, the combination 14-2 corresponding to the hierarchical shape of the second layer of the pillars of the runner, and a combination corresponding to the hierarchical shape of the link 15 of the runner.

Figure 13D:
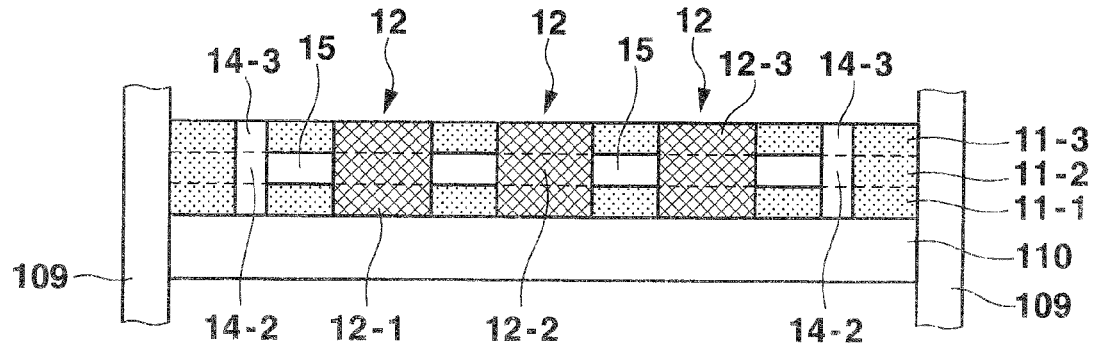

The powder material layer forming step (S211) and the combination forming step (S212) are repeated. Thus, as shown in FIG. 13D and FIG. 1.4A, the shaped objects 12 of the first, stage are stacked and formed as one in the powder material Layers 11-1 to 11-3. At the same time, the pillars 14 of the first stage are stacked and formed as one in the powder material layers 11-1 to 11-4. Further, the link 15 which links the pillars 14 to the shaped object 12 of the first stage, and the link 15 which links the shaped objects 12 of the first stage to each other are formed in the powder material layer 11-2. The shaped object 12 is supported by the pillars 14 while being linked to the link 15. Here, the link 15 of the runner preferably has the minimum thickness and strength that allows the shaped objects 12 to be linked to each other so that each of the shaped objects 12 can be easily separated in the later-described shaped object takeout process. Although the illustrated links are in the shape of square columns and relatively thick for convenience in FIG. 13A to FIG. 13D, FIG. 14A to FIG. 14C, FIG. 15A and FIG. 15B, and FIG. 16, the links are not limited to this shape.

Figure 14A:
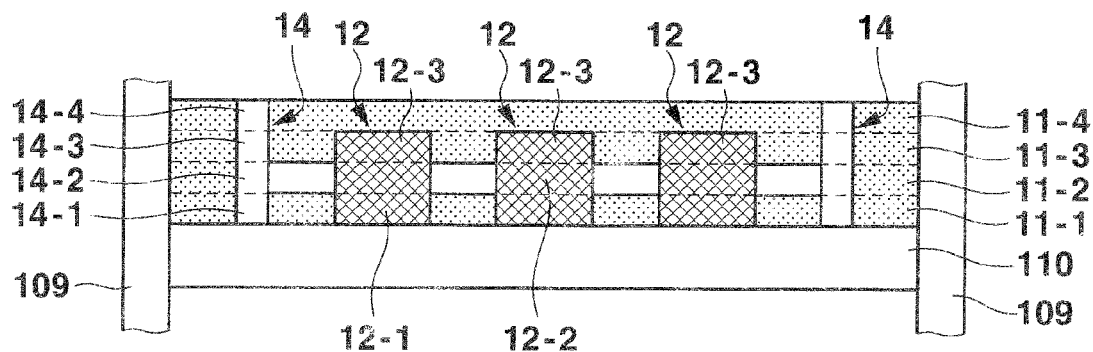
FIGS. 14A, 14B, and 14C are schematic process views (No. 2) showing how the shaped objects and the tray are formed in the shaped object/support member stack shaping process and the powder material removing process according to the third embodiment.
Figure 14B:
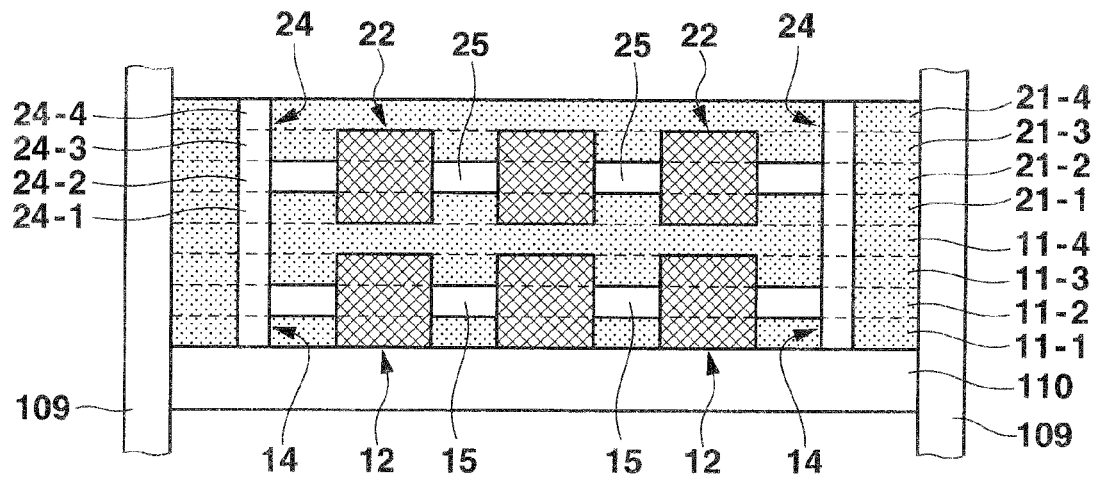
Figure 14C:
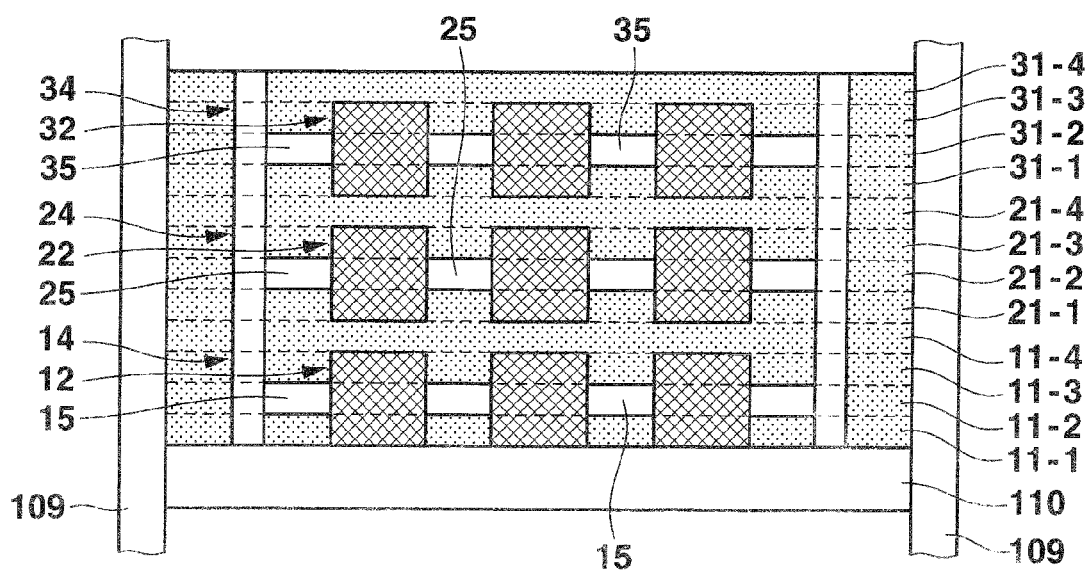
Figure 15A:
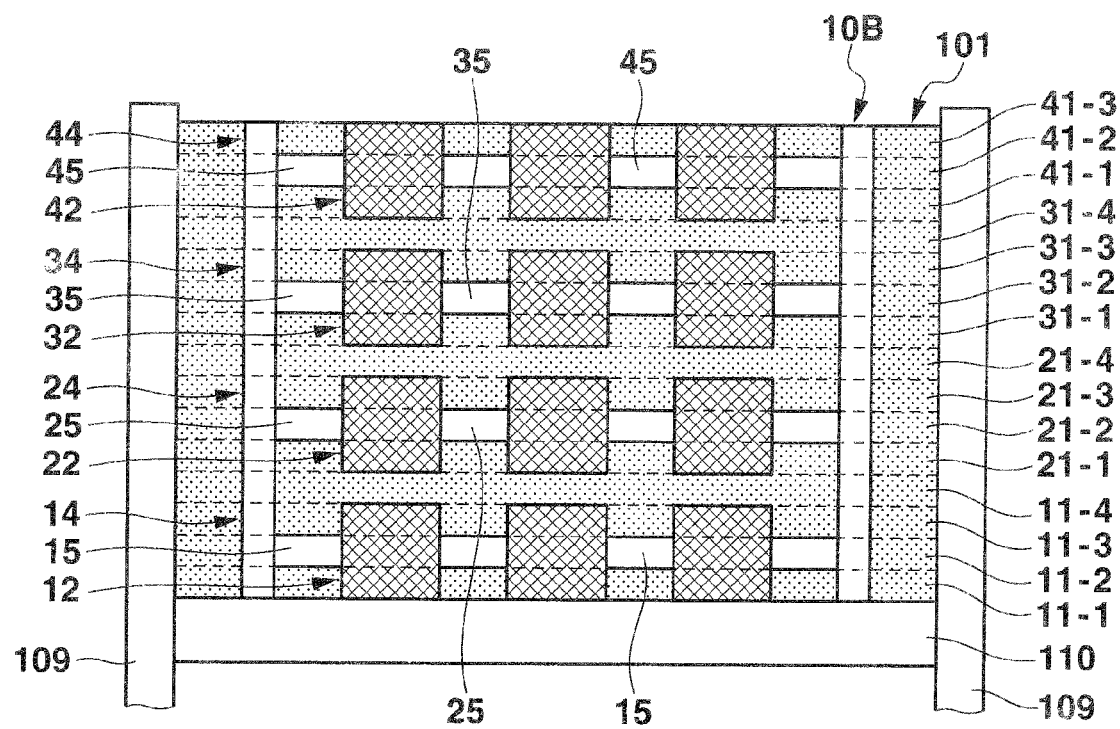
FIGS. 15A and 15B are schematic process views (No. 3) showing how the shaped objects and the tray are formed in the shaped object/support member stack shaping process and the powder material removing process according to the third embodiment.
Figure 16:
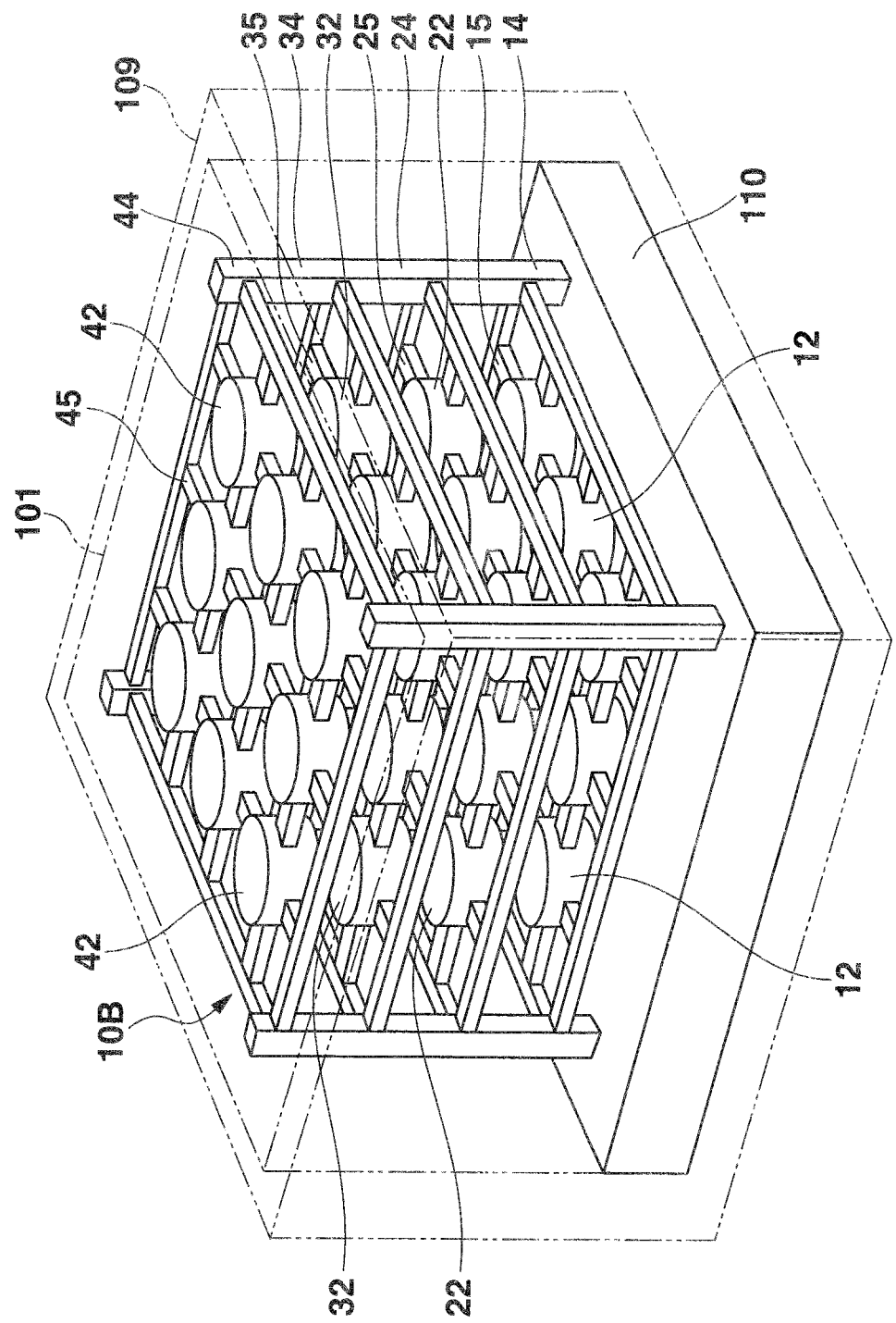
FIG. 16 is a schematic configuration diagram showing an example of the shaped objects and a runner that are formed by the shaped object/support member stack shaping process according to the third embodiment.

In the shaped object/runner stacking step (S214), the combination stacking step (S213) is then repeated to stack one stage of shaped objects and a runner having combinations of the respective layers to form stages of shaped objects and runners, as shown in FIG. 14B, FIG. 14C, and FIG. 15A. That is, the shaped objects 12, 22, 32, and 42 of the first to uppermost (fourth in the drawing) layers, the links 15, 25, 35, and 45 which link the shaped objects 12, 22, 32, and 42 of the respective stages, and the pillars 14, 24, 34, and 44 which are connected to the links 15, 25, 35, and 45 are stacked and formed as one in the powder material layers 11-1 to 11-4, 21-1 to 21-4, 31-1 to 31-4, and 41-1 to 41-3 in accordance with the shaped object hierarchical data and the tray hierarchical data.

Thus, as a result of the steps of the shaped object/support member stack shaping process (S103), as shown in FIG. 15A and FIG. 16, a runner 10B having the pillars 14, 24, and 34 and the links 15, 25, 35, and 45 is stacked and formed as one in the powder material 101 stacked on the shaping stage 110 by the cured powder material 101, and the shaped objects 12, 22, 32, and 42 of the respective stages of the runner 10B are formed into shapes supported by the pillars 14 while being linked to each other by the links 15, 25, 35, and 45 of the respective stages of the runner 10B.

Figure 15B:
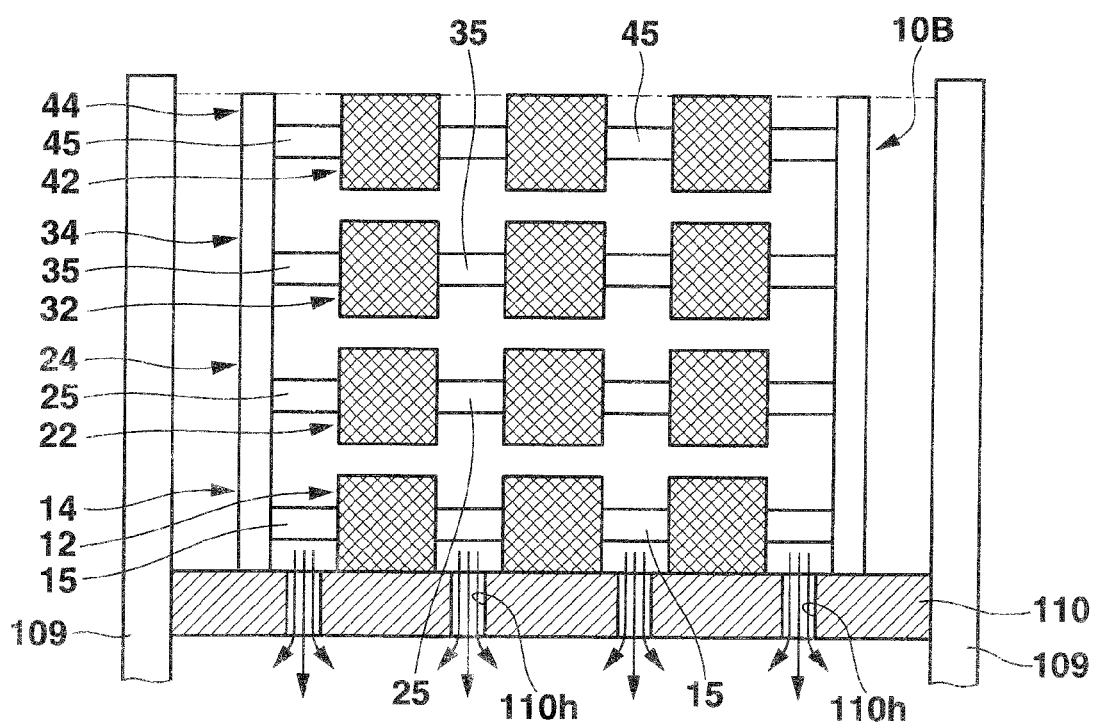

In the powder removing process (S104), as shown in FIG. 15B, the uncured powder material 101 stacked on the shaping stage 110 is then sucked from the powder discharge holes 110h and removed so expose the shaped objects 12, 22, 32, and 42, as in the first embodiment. Here, as described above (see FIG. 16), the shaped objects 12, 22, 32, and 42 of the respective stages are only linked to the links 15, 25, 35, and 45 of the respective stages of the runner 10B, and the upper side and lower side of the region other than the shaped objects 12, 22, 32, and 42 and the links 15, 25, 35, and 45 are in communication. Therefore, the powder-material 101 is discharged from the powder discharge holes 110h of the shaping stage 110 via this region. At the same time, the shaped objects 12, 22, 32, and 42 of the respective stages are exposed while being linked to the links 15, 25, 35, and 45 of the respective stages of the runner 10B and being supported by the pillars 14. Except for the shaped object 12 mounted on the shaping stage 110, each of the links 25, 35, and 45 may be a stack of powder material layers to have enough strength not to be cracked or cut by the weights of the shaped objects 22, 32, and 42 of the respective stages. As the shaped object 12 is linked to the link 15, the shaped object 12 is supported at a predetermined position without displacement by stress applied when the powder material 101 is discharged. However, the link 15 is not always necessary as long as the shaped object 12 has weight or a shape enough to prevent the displacement caused by she stress of the powder material 101.

In the shaped object takeout process (S105), the shaped objects 12, 22, 32, and 42 exposed from the powder material 101 by the powder removing process (S104) are then sequentially taken out. More specifically, as shown in FIG. 15B, the exposed shaped objects 12, 22, 32, and 42 are sequentially separated from the links 25, 35, and 45 of the respective stages of the runner 10B and taken out after the removal of all the powder material 101 from the shaping stage 110 or during the removal of the powder material 101 from the shaping stage 110.

According to this three-dimensional shaping method, when the powder material 101 on the shaping stage 110 is removed to take out the shaped objects 12, 22, 32, and 42, the shaped objects 12, 22, 32, and 42 are linked and supported by the links 15, 25, 35, and 45 of the respective stages of the runner 10B as shown in FIG. 15B. Therefore, it is possible to prevent the shaped objects 12, 22, 32, and 42 from failing down on the shaping stage 110 or contacting each other and being damaged or broken. Moreover, the shaped objects 12, 22, 32, and 42 are satisfactorily exposed while being linked and supported by the links 15, 25, 35, and 45 of the respective stapes. Thus, the shaped objects 12, 22, 32, and 42 can be easily separated and taken out from the respective stages of the runner 10B in the tank 109. The runner 103 may be made sufficiently firm so that the shaped objects 12, 22, 32, and 42 will be separated from the runner 10B after the shaped objects 12, 22, 32, and 42 being linked to the runner 10B are taken out from the tank 109.

Furthermore, when the shaped objects 12, 22, 32, and 42 are formed in a stacked state, the shaped objects 12, 22, 32, and 42 are linked to the links 15, 25, 35, and 45 of the respective stages of the runner 10B. Thus, the upper surface of the shaping stage 110 and the upper surfaces of the uppermost powder material layers 11-4, 21-4, and 31-4 of the respective stages serve as the reference planes for forming the shaped objects 12, 22, 32, and 42 of the respective stages, and the flexure and strain of the powder material layers 11-1 to 11-4, 21-1 to 21-4, 31-1 to 31-4, and 41-1 to 41-3 can be inhibited. Consequently, the shaped objects 12, 22, 32, and 42 having the original three-dimensional shape based on the three-dimensional CAD data can be satisfactorily formed.

Hence, according to the present embodiment as well, damage to the shaped objects can be inhibited and the shaped objects can be easily taken out, and production yield and productivity can be improved, when the powder stacking method is used to form a large volume of three-dimensional shaped objects. Moreover, according to the present embodiment, the adjacent shaped objects 12, 22, 32, and 42 of the respective stages can be formed to be linked by the links 15, 25, 35, and 45 of the runner 10B. Therefore, the number of stacked powder material layers necessary to form the shaped objects 12, 22, 32, and 42 of a plurality of stages is reduced, so that productivity can be further improved, and production costs can be reduced.

Fourth Embodiment

Now, the fourth embodiment of the three-dimensional shaping method according to the present invention is described.

In the case described above according to the third embodiment, the runner 10B having the links 15, 25, 35, and 45 which link the shaped objects 12, 22, 32, and 42 of the respective stages and the pillars 14, 24, 34, and 44 to which the links 15, 25, 35, and 45 are connected has an integral configuration as shown in FIG. 16. In the fourth embodiment, the runner 10B is configured to be separable stage by stage, as in the second embodiment described above.

Figure 17A:
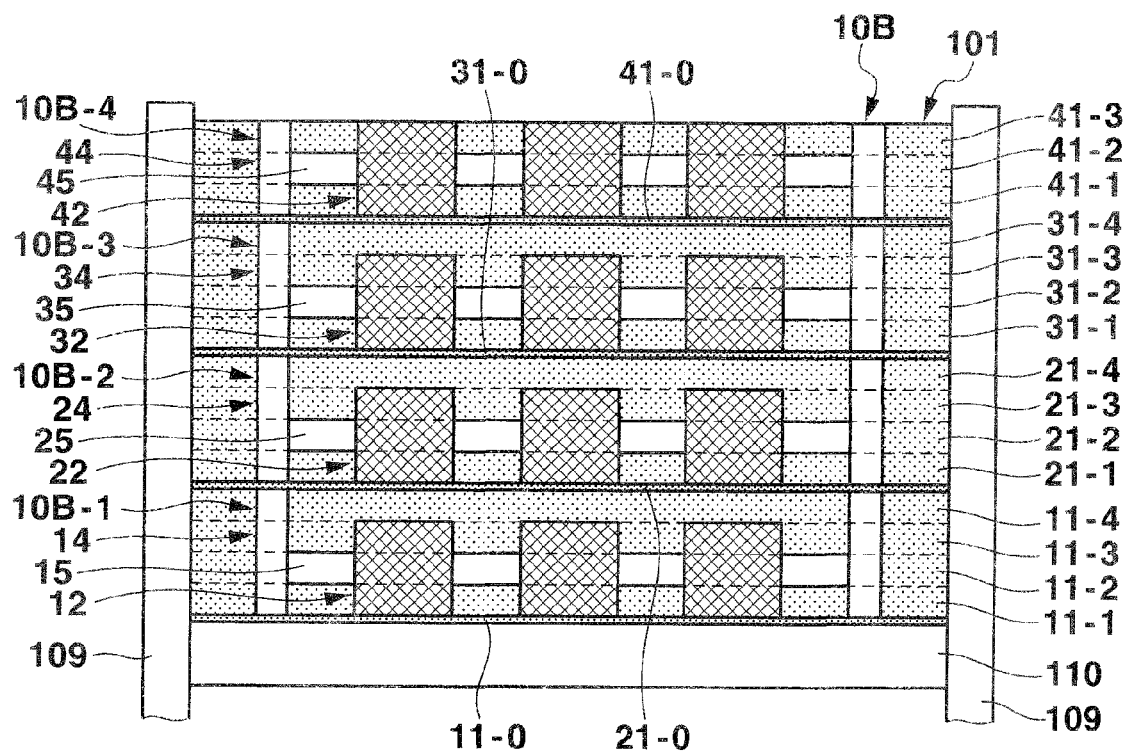
FIGS. 17A and 17B are schematic views showing one configuration example of shaped objects and a runner that are formed in a fourth embodiment of the three-dimensional shaping method according to the present invention.
Figure 17B:
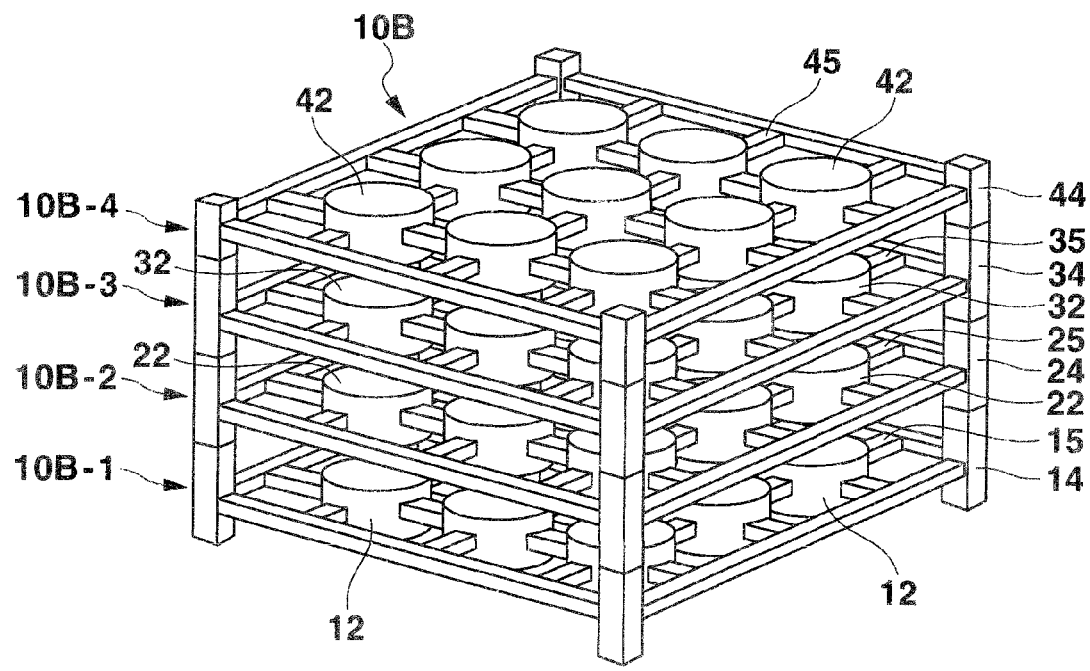
Figure 18:
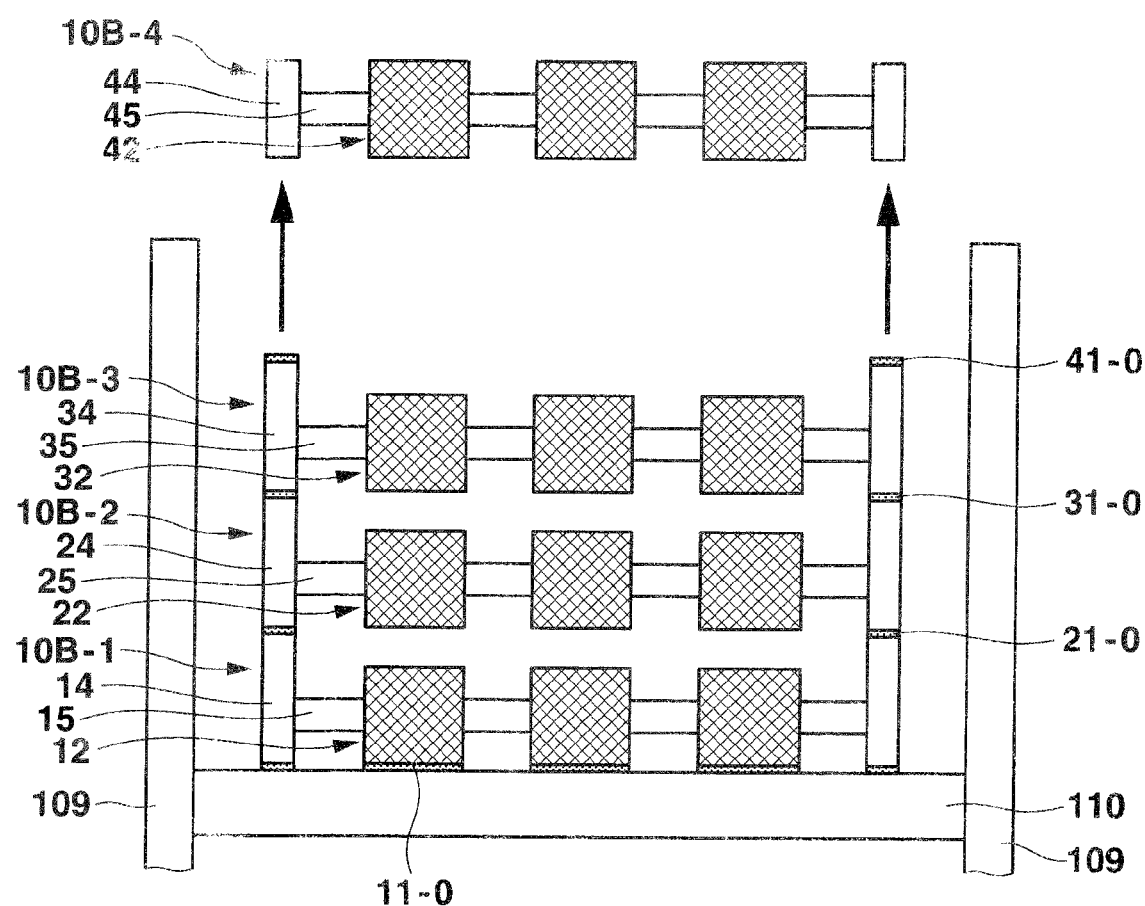
FIG. 18 is a schematic process view showing how the shaped objects are taken out in a shaped object takeout process according to the fourth embodiment.

FIGS. 17A and 17B are schematic views showing one configuration example of the shaped objects and the runner that are formed in the fourth embodiment of the three-dimensional shaping method according to the present invention, FIG. 17A is a schematic process view showing how the shaped objects and the runner are formed according to the present embodiment. FIG. 17B is a schematic configuration diagram showing an example of the runner formed according to the present embodiment. FIG. 18 is a schematic process view showing how the shaped objects are taken out in the shaped object takeout process according to the present embodiment. Processes, processing steps, and components that are equivalent to those according to the above-described third embodiment are denoted by the same reference signs and properly described with reference to FIG. 12, FIG. 13A to FIG. 13D, FIG. 14A to FIG. 14C, FIG. 15A and FIG. 15B, and FIG. 16.

In the fourth embodiment of the three-dimensional shaping method according to the present invention, in the shaped object/support member stack shaping process (S103) shown in the above-described third embodiment (see FIG. 1 and FIG. 12), the shaped objects 12, 22, 32, and 42 are linked by the links 15, 25, 35, and 45 of the respective stages of the runner 10B and stacked and formed in stages in the powder material 101 having the powder material layers 11-1 to 11-4, 21-1 to 21-4, 31-1 to 31-4, and 41-1 to 41-3 stacked on the shaping stage 110 as shown in FIG. 17A. The runner 10B is formed to be separable stage by stage.

More specifically, in the shaped object/support member stack: shaping process (S103), in order to prevent the shaped object 12 and the pillars 14 of a runner 10B-1 from being bound to the shaping stage 110, the binding prevention layer 11-0 having an uncured powder material is first formed on the entire upper surface of the shaping stage 110. The powder material layer forming step (S211), the combination forming step (S212), and the combination stacking step (S213) that are shown in FIG. 12 are then conducted, to stack and form the shaped object 12 of the first stage as one in the powder material layers 11-1 to 11-3. At the same time, the pillars 14 of the first stage are stacked and formed as one in the powder material layers 11-1 to 11-4, and the link 15 of the first stage which is linked to the shaped, objects 12 and which is connected to the pillars 14 is stacked and formed in the powder material layer 11-2. That is, as shown in FIG. 17B, the runner 10B-1 of the first stage having the pillars 14 and the link 15, and the shaped objects 12 of the first stage linked to the link 15 are stacked and formed as one. The pillars 14 and the shaped objects 12 are formed without being bound to the shaping stage 110 owing to the binding prevention layer 11-0.

In order to prevent the shaped object 22 of the second stage and the pillars 24 of a runner 10B-2 from being bound to the runner 10B-1 of the first stage, the binding prevention layer 21-0 having an uncured powder material, is formed on the entire upper surface of the powder material layer 11-4 which is the uppermost layer of the runner 10B-1 of the first, stage. As in the first stage, the shaped objects 22 of the second stage are stacked and formed as one in the powder material layers 21-1 to 21-3, and the pillars 24 of the second stage are stacked, and formed as one in the powder material layers 21-1 to 21-4, and moreover, the link 25 of the second stage which is linked to the shaped objects 22 and which is connected to the pillars 24 is stacked and formed in the powder material layer 21-2. That is, as in the first stage, the runner 10B-2 of the second, stage having the pillars 24 and the link 25, and the shaped objects 22 of the second, stage linked to the link 25 are stacked and formed as one. The pillars 24 are formed without being bound to the pillars 14 owing to the binding prevention layer 21-0.

Thus, after the binding prevention layer having the uncured powder material is formed, a series of processing to conduct the shaped object/runner stacking step (S214) shown in FIG. 12 is repeated.

Consequently, as shown in FIG. 17A, the shaped objects 12, 22, 32, and 42 of the first to uppermost stages and the runners 10B-1 to 10B-4 of the respective stages linked to the shaped objects 12, 22, 32, and 42 are stacked and formed in the powder material layers 11-1 to 11-4, 21-1 to 21-4, 31-1 to 31-4, and 41-1 to 41-3. Here, the sequentially stacked runners 10B-1 to 10B-4 are configured to be separable stage by stage by the intervention of the binding prevention layers 11-0 to 41-0 having the uncured powder material in the respective stages.

In the powder removing process (S104) shown in FIG. 1, the uncured powder material 101 stacked on the shaping stage 110 is removed to expose the shaped objects 12, 22, 32, and 42 of the respective stages. At the same time, the shaped objects 12, 22, 32, and 42 are exposed while being linked and supported by the links 15, 25, 35, and 45 of the runners 10B-1 to 10B-4 of the respective stages.

In the shaped object takeout process (S105) shown in FIG. 1, all the powder material 101 is removed from the shaping stage 110. Moreover, the exposed shaped objects 12, 22, 32, and 42 are sequentially separated from the links 15, 25, 35, and 45 of the runners 10B-1 to 10B-4 and taken out after or during the removal of the binding prevention layer 11-0 immediately under the shaped object 12, and the removal of the binding prevention layers 11-0, 21-0, 31-0, and 41-0 except for the binding prevention layers 11-0, 21-0, 31-0, and 41-0 immediately under the pillars 14, 24, 34, and 44. In this case, the shaped objects 12, 22, 32, and 42 may be independently taken out from the runners 10B-1 to 10B-4 of the respective stages, or the shaped objects 12, 22, 32, and 42 may be collectively taken out together with the separable runners 10B-1 to 10B-4 of the respective stages. That is, as shown in FIG. 18, the shaped objects 42 of the uppermost (fourth) stage may be collectively taken out from the shaping stage 110 (the three-dimensional shaping apparatus) while being linked and supported by the link 45 of the runner 10B-4 of the fourth stage. The shaped objects 32 of the third stage may be collectively taken out while being linked and supported by the link 35 of the runner 10B-3 of the third stage. The shaped objects 22 of the second stage may be collectively taken out while being linked and supported by the link 25 of the runner 10B-2 of the second stage. The shaped objects 12 of the first stage may be collectively taken out while being linked and supported by the link 15 of the runner 10B-1 of the first stage. Instead of being in powder form, each of the binding prevention layers 11-0 to 41-0 may be a sheet having an opening that allows the passage of the powder of the powder material. In this case, its surface is preferably fluorinated.

Thus, as in the above-described third embodiment, in the three-dimensional shaping method according to the present embodiment, when the powder material 101 on the shaping stage 110 is removed to take out the shaped objects 12, 22, 32, and 42, the shaped objects 12, 22, 32, and 42 are linked and supported by the links 15, 25, 35, and 45 of the runners 10B-1 to 10B-4 of the respective stages. Therefore, it is possible to prevent the shaped objects 12, 22, 32, and 42 from falling down on the shaping stage 110 or contacting each other and being damaged or broken. Moreover, the shaped objects 12, 22, 32, and 42 are satisfactorily exposed while being linked and supported by the links 15, 25, 35, and 45 of the runners 10B-1 to 10B-4 of the respective stages. Thus, the shaped objects 12, 22, 32, and 42 can be independently separated and taken out from the links 15, 25, 35, and 45 of the respective stages with ease. Alternatively, the runners 10B-1 to 10B-4 of the respective stages are separated so that the shaped objects 12, 22, 32, and 42 can be easily separated and taken out collectively together with the runners 10B-1 to 10B-4.

Furthermore, when the shaped objects 12, 22, 32, and 42 are formed in a stacked state, the shaped objects 12, 22, 32, and 42 are linked to the links 15, 25, 35, and 45 of the runners 10B-1 to 10B-4 of the respective stages. Thus, the upper surface of the shaping stage 110 and the upper surfaces of the uppermost powder material layers 11-4, 21-4, and 31-4 of the respective stages serve as the reference planes for forming the shaped objects 12, 22, 32, and 42 of the respective stages, and the flexure and strain of the powder material layers 11-1 to 11-4, 21-1 to 21-4, 31-1 to 31-4, and 41-1 to 41-3 can be inhibited. Consequently, the shaped objects 12, 22, 32, and 42 having the original three-dimensional shape based on the three-dimensional CAD data can be satisfactorily formed.

Hence, according to the present embodiment as well, damage to the shaped objects can be inhibited and the shaped objects can be easily taken out, and production yield and productivity can be improved, when the powder stacking method is used to form a large volume of three-dimensional shaped objects. Moreover, according to the present embodiment as well, the number of stacked powder material layers necessary to form the shaped objects 12, 22, 32, and 42 of a plurality of stages can be reduced, so that productivity can be further improved, and production costs can be reduced.

Fifth Embodiment

Now, the fifth embodiment of the three-dimensional shaping method according to the present invention is described.

In the cases described above according to the first to fourth embodiments, the tray 10A to mount the shaped objects 12, 22, 32, and 42 of the respective stages, and the runner 10B for linking define the spaces between the shaped objects 12, 22, 32, and 42, of the respective stages by the pillars 14, 24, 34, and 44 stacked and formed around the shaped objects 12, 22, 32, and 42. In the configuration according to the fifth embodiment, in addition to the pillars 14, 24, 34, and 44, assist pillars stacked and formed parallel to the former pillars are disposed at least between the shaped objects 12, 12, the shaped objects 22, 22, the shaped objects 32, 32, or the shaped objects 42, 42 of each stage.

Figure 19A:
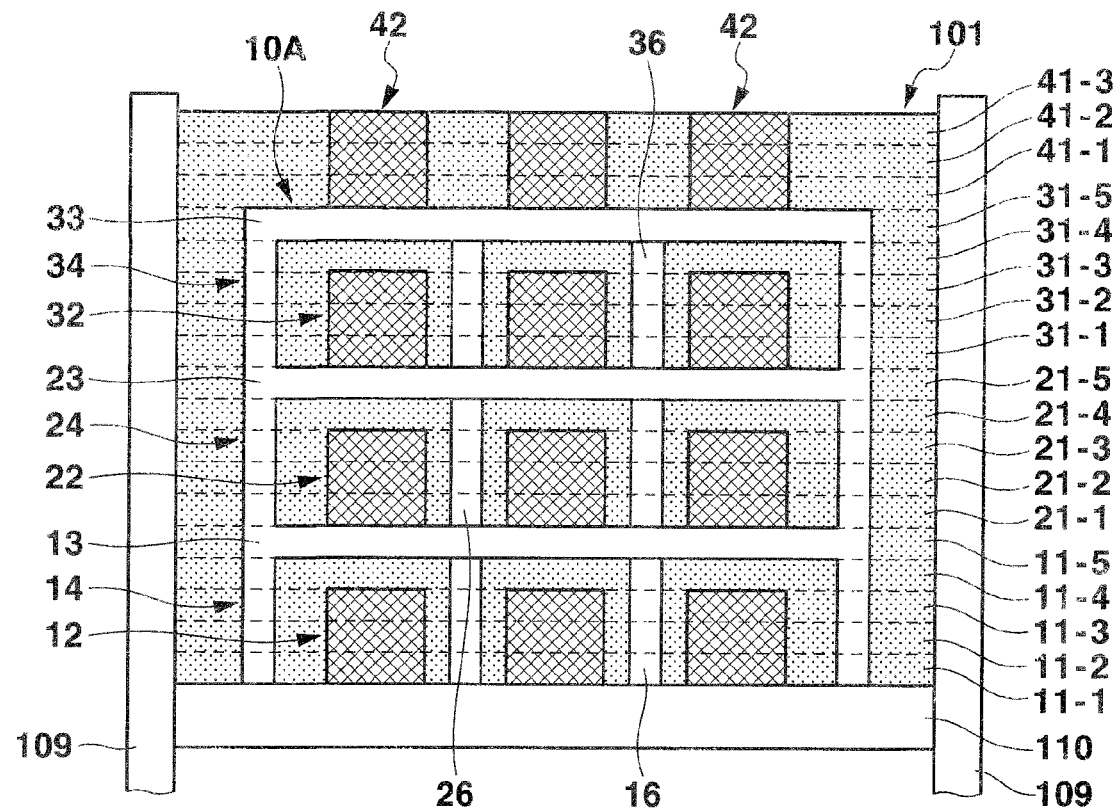
FIGS. 19A and 19B are schematic views showing how the shaped objects and the shaped object support member (tray, runner) are formed in a fifth embodiment of the three-dimensional shaping method according to the present invention.
Figure 19B:
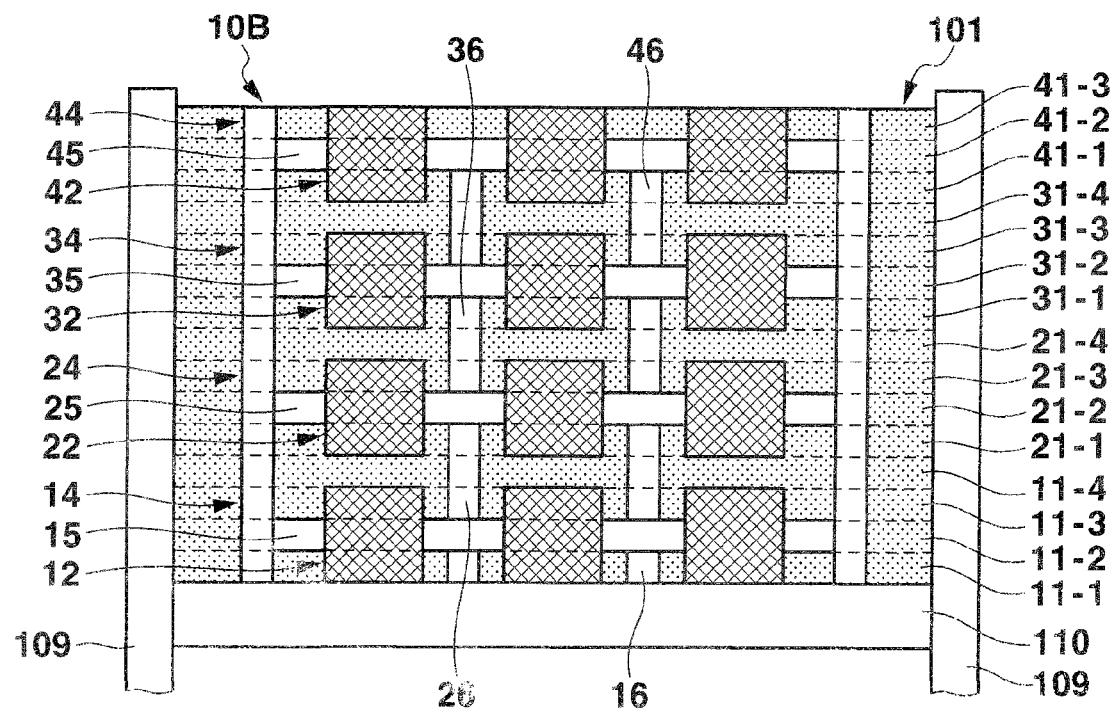

FIG. 19A and FIG. 19B are schematic views showing how the shaped objects and the shaped object support members (trays, runners) are formed in the fifth embodiment of the three-dimensional shaping method according to the present invention. FIG. 19A is a schematic process view showing the first formation state of the shaped objects and the shaped object support members according to the present embodiment. FIG. 19B is a schematic process view showing the second formation state of the shaped objects and the shaped object support members according to the present embodiment. In the configuration shown in FIG. 19A and FIG. 19B, the assist pillar is formed in the shaped object support member (the tray 10A, the runner 10B) shown in the first to third embodiments described above. However, the present invention is not limited thereto. The assist pillar may be formed in the shaped object support member (tray, runner) shown in the second and fourth embodiments. Processes, processing steps, and components that are equivalent to those according to the above-described first to fourth embodiments are described by the same reference signs.

The first formation state of the shaped objects and the shaped object support members (trays) in the fifth embodiment of the three-dimensional shaping method according to the present invention is as shown in FIG. 19A. In the tray 10A (see FIG. 6B) shown in the first embodiment described above, an assist pillar 16 for linking the shaping stage 110 located between the shaped objects 12, 12 and the tray body 13 is formed, an assist pillar 26 for linking the tray body 13 located between the shaped objects 22, 22 and the tray body 23 is formed, and an assist pillar 36 for linking the tray body 23 located between the shaped objects 32, 32 and the tray body 33 is formed.

More specifically, in the shaped object/support member stack shaping process (S103) shown in FIG. 1, the powder material layer forming step (S111), the combination forming step (S112), and the combination stacking step (S113) that are shown in FIG. 2 are conducted to stack and form the shaped object 12 of the first stage as one in the powder material layers 11-1 to 11-3. At the same time, the pillars 14 and the assist pillars 16 of the first stage are stacked and formed as one in the powder material layers 11-1 to 11-4, and the tray body 13 of the first stage joined to the pillars 14 and the assist pillars 16 is stacked and formed in the powder material layer 11-5. Here, for example, as shown in FIG. 19A, the pillars 14 are formed in a peripheral region surrounding the shaped objects 12 stacked and formed on the shaping stage 110, and the assist pillars 16 are formed parallel to the pillars 14 in a region between the shaped objects 12, 12.

In the shaped object/tray stacking step (S114), the combination stacking step (S113) is then repeated to form the shaped objects 12, 22, and 32 of the first to third stages in the powder material layers 11-1 to 11-5, 21-1 to 21-5, and 31-1 to 31-5, and form the tray 10A in which the tray bodies 13, 23, and 33, the pillars 14, 24, and 34, and the assist pillars 16, 26, and 36 are sequentially stacked and formed as one. The assist pillar 16 is preferably bound to at least one of the shaping stage 110 and the tray body 13, the assist pillar 26 is preferably bound to at least one of the tray body 13 and the tray body 23, and the assist pillar 36 is preferably bound to at least one of the tray body 23 and the tray body 33.

According to the three-dimensional shaping method to which the tray 10A having the above-described configuration is applied, in the powder removing process (S104) and the shaped object takeout process (S105) shown in FIG. 1, the shaped objects 22, 32, and 42 are mounted on and supported by the tray bodies 13, 23, and 33 which are supported by the pillars 14, 24, and 34 and the assist pillars 16, 26, and 36 of the respective stages of the tray 10A. It is therefore possible to satisfactorily prevent the tray bodies 13, 23, and 33 from collapsing under the weights of the shaped objects 22, 32, and 42 and falling down on the shaping stage 110, and prevent the shaped objects 12, 22, 32, and 42 from being damaged. As the shaped objects 12, 22, 32, and 42 are exposed while being securely mounted on and supported by the tray bodies 13, 23, and 33 of the respective stages, the shaped objects 12, 22, 32, and 42 can be easily separated and taken out from the respective stages of the tray 10A.

Furthermore, as the pillars 14, 24, and 34 and the assist pillars 16, 26, and 36 of the respective stages are provided on the lower surfaces of the tray bodies 13, 23, and 33 of the respective stages of the tray 10A, the tray bodies 13, 23, and 33 and the shaped objects 22, 32, and 42 of the respective stages are supported at more points, the loads of the tray bodies 13, 23, and 33 and the shaped objects 22, 32, and 42 of the respective stages applied to the above points are reduced, and the flexure and strain of the reference planes for forming the shaped objects 12, 22, 32, and 42 are satisfactorily inhibited. Consequently, the shaped objects 12, 22, 32, and 42 having the original three-dimensional shape based on the three-dimensional CAD data can be more satisfactorily formed.

The second formation state of the shaped objects and the shaped object support members (runners) in the present embodiment is as shown in FIG. 19B. In the tray 10A (see FIG. ISA) shown in the third embodiment described above, the assist pillar 16 is formed between the shaping stage 110 located between the shaped objects 12, 12 and the link 15 located between the shaped objects 12, 12, the assist pillar 26 is formed between the link 15 located between the shaped objects 12, 12 and the link 25 located between, the shaped objects 22, 22, the assist pillar 36 is formed between the link 25 located between the shaped objects 22, 22 and the link 35 located between the shaped objects 32, 32, and the assist pillar 46 is formed between the link 35 located between the shaped objects 32, 32 and the link 45 located between the shaped objects 42, 42.

More specifically, in the shaped object/support member stack shaping process (S103) shown in FIG. 1, the powder material layer forming step (S211), the combination forming step (S212), and the combination stacking step (S213) that are shown in FIG. 12 are conducted to stack and form the shaped object 12 of the first stage as one in the powder material layers 11-1 to 11-3. At the same time, the pillars 14 of the first stage are stacked and formed, as one in the powder material layers 11-1 to 11-4, and the link 15 which is connected to the pillars 14 and which links the shaped objects 12 of the first stage to each other is formed in the powder material layers 11-1 to 11-4. Moreover, the assist pillar 16 connected to the link 15 is stacked and formed in the powder material layers 11-1 to 11-4. Here, for example, as shown in FIG. 19B, the pillars 14 are formed in the peripheral region surrounding the shaped objects 12 stacked and formed on the shaping stage 110, and the assist pillars 16 are formed parallel to the pillars 14 in the region between the shaped objects 12 where the link 15 is formed.

In the shaped object/runner stacking step (S214), the combination stacking step (S113) is then repeated to form the shaped objects 12, 22, 32, and 42 of the first to uppermost stages in the powder material layers 11-1 to 11-4, 21-1 to 21-4, 31-1 to 31-4, and 41-1 to 41-3, and form the runner 10B in which the links 15, 25, 35, and 45, the pillars 14, 24, 34, and 44, and the assist pillars 16, 26, 36, and 46 are sequentially stacked, as shown in FIG. 19B. The assist pillar 16 is preferably bound to at least one of the shaping stage 110 and the link 15. The assist pillar 26 is preferably bound to at least one of the link 15 and the link 25. The assist pillar 36 is preferably bound to at least one of the link 25 and the link 35. The assist pillar 46 is preferably bound to at least one of the link 35 and the link 45.

According to the three-dimensional shaping method to which the runner 10B having the above-described configuration is applied, in the powder removing process (S104) and the shaped object takeout process (S105) shown in FIG. 1, the shaped objects 12, 22, 32, and 42 are linked and supported by the links 15, 25, 35, and 45 which are supported by the pillars 14, 24, 34, and 44 and the assist pillars 16, 26, 36, and 46 of the respective stages of the runner 10B. It is therefore possible to satisfactorily prevent the links 15, 25, 35, and 45 from collapsing under the weights of the shaped objects 22, 32, and 42 and failing down on the shaping stage 110, and prevent the shaped objects 12, 22, 32, and 42 from being damaged. As the shaped objects 12, 22, 32, and 42 are exposed while being securely linked and supported by the links 15, 25, 35, and 45 of the respective stages, the shaped objects 12, 22, 32, and 42 can be easily separated and taken out from the respective stages of the runner 10B.

Furthermore, as the assist pillars 16, 26, 36, and 46 are provided, the shaped objects 12, 22, 32, and 42 of the respective stages are supported at more points, the loads of the shaped objects 12, 22, 32, and 42 applied to the above points are reduced, and the flexure and strain of the reference planes for forming the shaped objects 12, 22, 32, and 42 are satisfactorily inhibited. Consequently, the shaped objects 12, 22, 32, and 42 having the original three-dimensional shape based on the three-dimensional CAD data can be satisfactorily formed.

Hence, according to the present embodiment as well, damage to the shaped objects can be inhibited and the shaped objects can be easily taken out, and production yield and productivity can be improved, when the powder stacking method is used to form a large volume of three-dimensional shaped objects.

(Three-Dimensional Shaping Apparatus)

Now, the three-dimensional shaping apparatus that enables the above-described three-dimensional shaping method is described.

Figure 20:
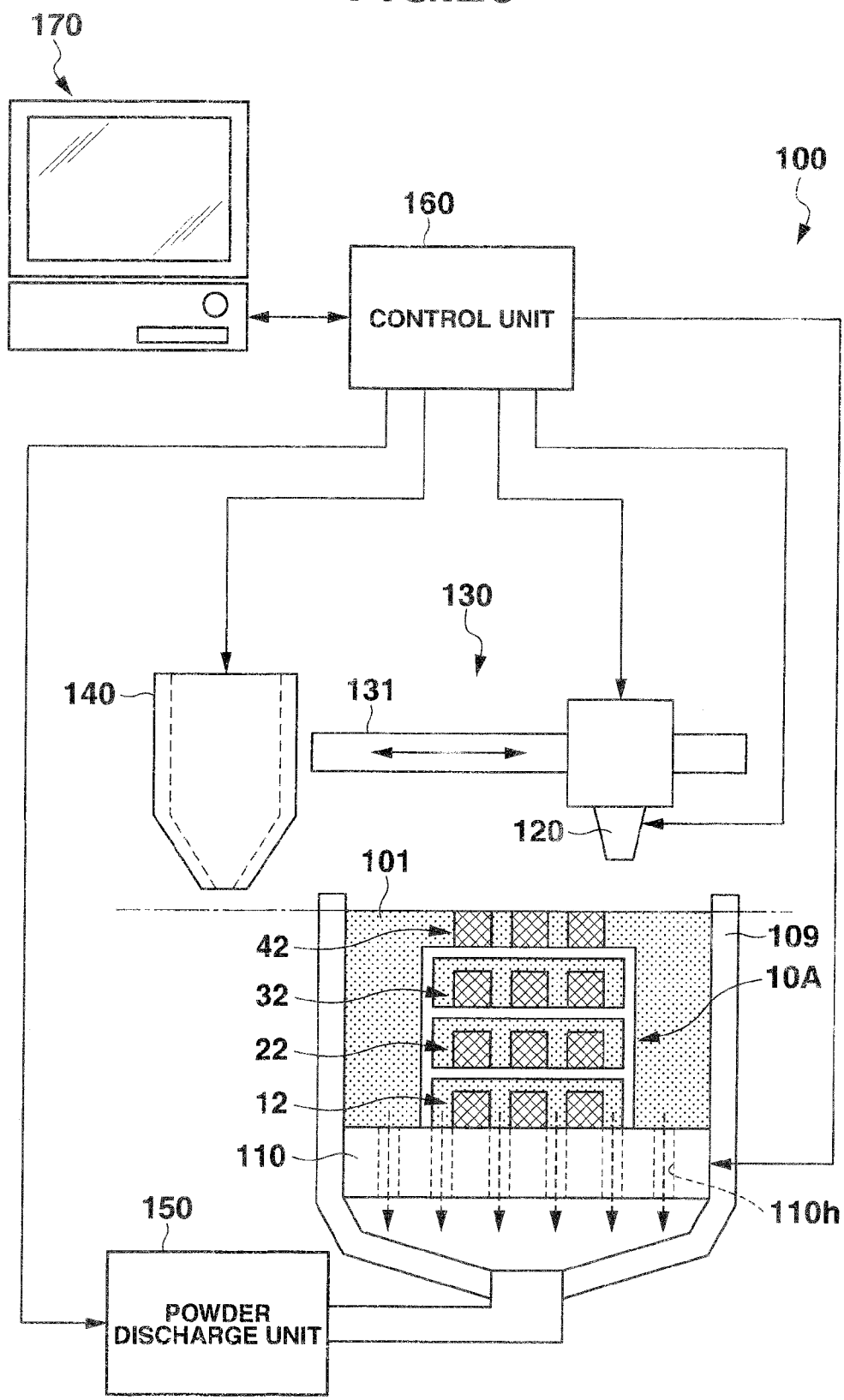
FIG. 20 is a schematic configuration diagram showing an example of a three-dimensional shaping apparatus that enables the three-dimensional shaping method according to the present invention.

FIG. 20 is a schematic configuration diagram showing an example of the three-dimensional shaping apparatus that enables the three-dimensional shaping method according to the present invention. Here, components equivalent to those according to the above-described embodiments are described by the same reference signs.

In the above-described three-dimensional shaping method (see FIG. 1), at least the shaped object/support member hierarchical data generating process (S102), the shaped object/support member stack shaping process (S103), the powder removing process (S104) can be conducted by a three-dimensional shaping apparatus 100 shown in FIG. 20.

For example, as shown in FIG. 20, the three-dimensional shaping apparatus 100 according to the present embodiment generally comprises a shaping stage 110, a binder discharging unit 120, a scan mechanism 130, a powder material supply unit 140, a powder material discharge unit 150, a control unit (shaping control unit) 160, and a data processing unit 170 (hierarchical shape data generating unit).

The shaping stage 110 has an upper surface serving as a reference plane for forming shaped objects 12, 22, 32, and 42 based on the three-dimensional CAD data in the above-described three-dimensional shaping method. If the shaped object/support member stack shaping process (S103) is conducted, powder material layers are sequentially stacked on the upper surface of the shaping stage 110, and the shaped objects 12, 22, 32, and 42 based on the three-dimensional CAD data and a shaped object support member (a tray 10A, a runner 10B) to support the shaped objects 12, 22, 32, and 42 are formed in the powder material layers. The shaping stage 110 also comprises, for example, an unshown elevator mechanism to control the position of the shaping stage 110 in the vertical direction (Z-direction) so that the height of the upper surface of each of the powder material layers stacked and formed on the upper surface of the shaping stage 110 is always constant. The shaping stage 110 also has, for example, powder discharge holes 110h through which the upper surface is in communication with the lower surface. If the powder removing process (S104) is conducted, a powder material 101 stacked, on the upper surface of the shaping stage 110 is discharged via the powder discharge holes 110h.

The binder discharging unit 120 comprises a discharge mechanism equivalent to a printer head, used in an inkjet printer to discharge a binder as liquid droplets. In the combination forming step (S112, S212) of the shaped object/support member stack shaping process (S103), the scan mechanism 130 moves the binder discharging unit 120 in a plane (X-Y plane) parallel to the upper surface of the shaping stage 110 in accordance with hierarchical data, regarding the shaped objects 12, 22, 32, and 42 and the shaped object support member (tray 10A, runner 10B). Thus, the binder is discharged and cured in the region where the shaped objects 12, 22, 32, and 42 are to be formed and the region where the shaped object support member (tray 10A, runner 10B) is to be formed, in the respective powder material layers formed on the upper surface of the shaping stage 110.

The scan mechanism 130 comprises a guide rail 131 extending in perpendicular two directions (X-Y direction) in the plane parallel to the upper surface of the shaping stage 110. In the combination forming step (S112, S212) of the shaped object/support member stack shaping process (S103), the binder discharging unit 120 is moved along the guide rail 131 in accordance with she hierarchical data regarding the shaped objects 12, 22, 32, and 42 and the shaped object support member (tray 10A, runner 10B). Thus, the binder discharging unit 120 is moved to the positions immediately above the region where the shaped objects 12, 22, 32, and 42 are to be formed and the region where the shaped object support member (tray 10A, runner 10B) is to be formed, in nine powder material layers of the respective layers formed on the upper-surface of the shaping stage 110.

The powder material supply unit 140 retains the powder material. In the powder material layer forming step (S111, S211) of the shaped object/support member stack shaping process (S103), the powder material is thinly and uniformly spread on the upper surface of the shaping stage 110 to form one layer of a powder material layer having a predetermined thickness.

The powder material discharge unit 150 is connected to the powder discharge holes 110h provided in the shaping stage 110. In the powder removing process (S104), the uncured powder material 101 stacked on the upper surface of the shaping stage 110 is sucked via the powder discharge holes 110h and thus discharged from the upper surface of the shaping stage 110.

The control unit 160 controls at least the operations of the shaping stage 110, the binder discharging unit 120, the scan mechanism 130, the powder material supply unit 140, and the powder material discharge unit 150. More specifically, in the shaped object/support member stack shaping process (S103), the control unit 160 controls the operations of the shaping stage 110, the binder discharging unit 120, the scan mechanism 130, and the powder material supply unit 140 in accordance with the hierarchical data regarding the shaped objects and the shaped object support member supplied from the data processing unit 170. Thus, the shaped objects 12, 22, 32, and 42 and the shaped object support member (tray 10A, runner 10B) based on the three-dimensional CAD data are stacked and formed in stages in the powder material 101 stacked on the shaping stage 110. In the powder removing process (S104), the control unit 160 controls the operations of the shaping stage 110 and the powder material discharge unit 150. Thus, the uncured powder material 101 stacked on the shaping stage 110 is discharged and removed, and the shaped objects 12, 22, 32, and 42 of the respective stages are exposed while being supported by the shaped object support member (tray 10A, runner 10B).

The data processing unit 170 has, for example, an arithmetic unit such as a computer. In the shaped object/support member hierarchical data generating process (S102), hierarchical data (soaped object hierarchical data, tray hierarchical data, runner hierarchical data) when the shaped objects 12, 22, 32, and 42 and the shaped object support member (tray 10A, runner 10B) for mounting or linking and supporting the shaped objects 12, 22, 32, and 42 are sliced (divided) into layers in a plane parallel to the upper surface (reference plane) of the shaping stage 110 is generated on the basis of the three-dimensional CAD data for the shaped objects 12, 22, 32, and 42.

The three-dimensional shaping apparatus 100 having such a configuration conducts the three-dimensional shaping method shown in the above-described first to fifth embodiments. As a result, the shaped objects 12, 22, 32, and 42 and the shaped object support member (tray 10A, runner 10B) for mounting or linking and supporting the shaped objects 12, 22, 32, and 42 are stacked and formed in the powder material 101 stacked on the shaping stage 110.

Consequently, in the powder removing process (S104) and the shaped object takeout process (S105), the shaped objects 22, 32, and 42 are exposed from the powder material 101 while being mounted or linked and supported by the respective stages of the shaped object support member (tray 10A, runner 10B). It is therefore possible to prevent the shaped objects 12, 22, 32, and 42 from falling down on the shaping stage 110 or contacting each other and being damaged, and to easily take out the shaped objects 12, 22, 32, and 42. In the shaped object/support member stack shaping process, the shaped objects 22, 32, and 42 are sequentially stacked while being mounted on and linked to the shaped object support member (tray 10A, runner 10B). Therefore, the flexure and strain of the reference planes for forming the shaped objects 12, 22, 32, and 42 can be inhibited, and the shaped objects 12, 22, 32, and 42 having a satisfactory three-dimensional shape can be formed in stages. Hence, production yield and productivity can be improved even when the powder stacking method is used to form a large volume of three-dimensional shaped objects.

In the cases according to the embodiments described above, the shaped objects and the shaped object support member are stacked and formed by the repetition of the process of discharging the binder into the powder material in each layer and curing the binder in accordance with the hierarchical data regarding the shaped objects and the shaped object support member. The present invention is not limited thereto. For example, photo-curing resin powder may be used as the powder material, and the shaped objects and the shaped object support member may be stacked and formed by repeating the process of applying laser light having a predetermined wavelength to the region corresponding to the hierarchical data regarding the shaped objects and the shaped object support member to selectively cure the photo-curing resin powder.

Moreover, in the cases according to the embodiments described above, the shaped objects having the same three-dimensional shape are formed on each stage in the powder material layer for convenience of explanation. The present invention is not limited thereto. For example, a mixture of shaped objects having different three-dimensional shapes may be stacked and formed on each stage in the powder material layer, or shaped objects having different three-dimensional shapes may be stacked and formed stage by stage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional shaping method for a three-dimensional shaping apparatus, comprising:
    forming a plurality of combinations to respectively be a plurality of levels of a three-dimensional shaped object and also forming a plurality of combinations to respectively be a plurality of levels of a shaped object support member in a plurality of respective powder material layers each having an uncured powder material in accordance with hierarchical shape data corresponding to each of the powder material layers, the shaped object support member comprising a pillar which is formed around the three-dimensional shaped object and a tray body which is supported by the pillar and is formed to cover the three-dimensional shaped object;

wherein said forming the plurality of combinations to be the plurality of levels of the three-dimensional shaped object and said forming the plurality of combinations to be the plurality of levels of the shaped object support member include:
stacking a powder material layer having an uncured powder material of a first upper level so as to cover the combinations of the three-dimensional shaped object and a lower part of the combinations of the pillar of the shaped object support member which are formed in the powder material layers of lower levels,
forming an upper part of the combination of the pillar of the shaped object support member in the powder material layer of the first upper level so as to be bound to a part of the lower part of the combinations of the pillar,
stacking a powder material layer having an uncured powder material of a second upper level so as to cover the combinations of the three-dimensional shaped object and the upper part of the combination of the pillar, and
forming a combination of the tray body of the shaped object support member in the powder material layer of the second upper level so as to be bound to the upper part of the combination of the pillar, and so as to face the combinations of the three-dimensional shaped object through an uncured portion of the powder material layer of the first upper level.

2. The three-dimensional shaping method according to claim 1, wherein:
said forming the plurality of combinations to be the plurality of levels of the three-dimensional shaped object comprises dropping a binder in a region to be the plurality of combinations which are to be the plurality of levels of the three-dimensional shaped object in the powder material layers to form the plurality of combinations which are to be the plurality of levels of the three-dimensional shaped object, and
said forming the plurality of combinations to be the plurality of levels of the shaped object support member comprises dropping a binder in a region to be the plurality of combinations which are to be the plurality of levels of the shaped object support member in the powder material layers to form the plurality of combinations which are to be the plurality of levels of the shaped object support member.

3. The three-dimensional shaping method according to claim 1, wherein:
a plurality of the three-dimensional shaped objects and a plurality of the shaped object support members are respectively formed on a plurality of stages, and
the method further comprises forming the shaped object support of an upper stage among the plurality of stages so as to be mounted on the shaped object support member of a lower stage among the plurality of stages, and so as not to be bound to the shaped object support member of the lower stage.

4. The three-dimensional shaping method according to claim 1, further comprising:
stacking a binding prevention layer so as to cover the three-dimensional shaped object and the shaped object support member formed in a lower stage,
stacking other powder material layers for an upper stage on the binding prevention layer, and
forming another three-dimensional shaped object and another shaped object support member in said other powder material layers for the upper stage so as not to be bound to the three-dimensional shaped object and the shaped object support member formed in the lower stage.

5. The three-dimensional shaping method according to claim 1, wherein:
a plurality of the three-dimensional shaped objects and a plurality of the shaped object support members are respectively formed on a plurality of stages, and
the method further comprises forming an assist pillar parallel to the pillar between the tray body of the shaped object support member of a lower stage among the plurality of stages and the tray body of the shaped object support member of an upper stage among the plurality of stages.

6. A three-dimensional shaping method for a three-dimensional shaping apparatus, comprising:
forming a plurality of combinations to respectively be a plurality of levels of a three-dimensional shaped object and also forming a plurality of combinations to respectively be a plurality of levels of a shaped object support member in a plurality of respective powder material layers each having an uncured powder material in accordance with hierarchical shape data corresponding to each of the powder material layers, the shaped object support member comprising a pillar which is formed around the three-dimensional shaped object and a tray body which is supported by the pillar and is formed to cover the three-dimensional shaped object;
stacking a binding prevention layer so as to cover a combination of the tray body of the shaped object support member;
stacking a powder material layer having an uncured powder material of another level so as to cover the binding prevention layer; and
forming a combination of a level of another three-dimensional shaped object and a combination of a level of another shaped object support member in the powder material layer of said another level so as to face the combination of the tray body of the shaped object support member through the binding prevention layer.

7. A three-dimensional shaping method for a three-dimensional shaping apparatus, comprising:
forming a plurality of combinations to respectively be a plurality of levels of a three-dimensional shaped object and also forming a plurality of combinations to respectively be a plurality of levels of a shaped object support member in a plurality of respective powder material layers each having an uncured powder material in accordance with hierarchical shape data corresponding to each of the powder material layers, the shaped object support member comprising a pillar which is formed around the three-dimensional shaped object and a tray body which is supported by the pillar and is formed to cover the three-dimensional shaped object;
stacking a binding prevention layer so as to cover a combination of the tray body of the shaped object support member,
stacking a powder material layer having an uncured powder material of another level so as to cover the binding prevention layer,
forming a combination of a level of another three-dimensional shaped object and a combination of a level of another shaped object support member in the powder material layer of said another level so as to face the combination of the tray body of the shaped object support member through the binding prevention layer;

wherein said forming the plurality of combinations to be the plurality of levels of the three-dimensional shaped object and said forming the plurality of combinations to be the plurality of levels of the shaped object support member include:

stacking a powder material layer having an uncured powder material of a first upper level so as to cover the combinations of the three-dimensional shaped object and a lower part of the combinations of the pillar of the shaped object support member which are formed in the powder material layers of lower levels, forming an upper part of the combination of the pillar of the shaped object support member in the powder material layer of the first upper level so as to be bound to a part of the lower part of the combinations of the pillar, stacking a powder material layer having an uncured powder material of a second upper level so as to cover the combinations of the three-dimensional shaped object and the upper part of the combination of the pillar, and forming a combination of the tray body of the shaped object support member in the powder material layer of the second upper level so as to be bound to the upper part of the combination of the pillar, and so as to face the combinations of the three-dimensional shaped object through an uncured portion of the powder material layer of the first upper level.

* * * * *